(12) United States Patent
Sudo et al.

(10) Patent No.: US 12,278,422 B2
(45) Date of Patent: Apr. 15, 2025

(54) SUPPRESSION OF REFLECTED WAVE INTERFERENCE FROM ANTENNA-MOUNTING PLATE IN SERVICE LINK OF HAPS

(71) Applicant: SoftBank Corp., Tokyo (JP)

(72) Inventors: Shoichi Sudo, Tokyo (JP); Kenji Hoshino, Tokyo (JP); HoYu Lin, Tokyo (JP)

(73) Assignee: SoftBank Corp., Tokyo (JP)

( * ) Notice: Subject to any disclaimer, the term of this patent is extended or adjusted under 35 U.S.C. 154(b) by 233 days.

(21) Appl. No.: 18/012,706

(22) PCT Filed: Jun. 29, 2021

(86) PCT No.: PCT/JP2021/024574
§ 371 (c)(1),
(2) Date: Dec. 23, 2022

(87) PCT Pub. No.: WO2022/004728
PCT Pub. Date: Jan. 6, 2022

(65) Prior Publication Data
US 2023/0335888 A1    Oct. 19, 2023

(30) Foreign Application Priority Data
Jul. 3, 2020    (JP) ................. 2020-115954

(51) Int. Cl.
*H01Q 1/28*    (2006.01)
*H01Q 3/06*    (2006.01)
(Continued)

(52) U.S. Cl.
CPC ............... *H01Q 1/28* (2013.01); *H01Q 3/06* (2013.01); *H01Q 3/26* (2013.01); *H01Q 19/021* (2013.01);
(Continued)

(58) Field of Classification Search
CPC ............ H01Q 1/28; H01Q 3/26; H01Q 21/20; H01Q 3/06; H01Q 19/021; H04B 7/18504
See application file for complete search history.

(56) References Cited

U.S. PATENT DOCUMENTS 10,249,948 B2    4/2019    Feria et al.
11,177,874 B2 *  11/2021   Hoshino ............... H01Q 21/20
(Continued)

FOREIGN PATENT DOCUMENTS

| CN | 110085975 A | 8/2019 |
|---|---|---|
| JP | 5-78018 | 10/1993 |

(Continued)

OTHER PUBLICATIONS

European Search Report, Dated Jul. 5, 2024.
(Continued)

*Primary Examiner* — Hai V Tran
(74) *Attorney, Agent, or Firm* — Muirhead and Saturnelli, LLC

(57) ABSTRACT

Provided is an aerial-staying type communication relay apparatus that can suppress fluctuations in a directivity pattern due to reflection at an antenna-mounting member to which a service link antenna is mounted, stably fix a footprint of a cell, and as a result, prevent deterioration of communication quality. The communication relay apparatus includes an antenna having plural antenna elements that form a cell for performing a radio communication of a service link to and from the terminal apparatus and an antenna-mounting member to which the antenna is mounted, and a layer of radio wave absorber or a layer of frequency-selective electromagnetic shielding member that selectively shields radio waves having a frequency of the service link, which is provided on an outer surface exposed to an outside of the antenna-mounting member. Phases and amplitudes of (Continued)

signals transmitted and received via each of the plural antenna elements of the antenna may be controlled.

15 Claims, 20 Drawing Sheets

(51) Int. Cl.
    *H01Q 3/26*     (2006.01)
    *H01Q 19/02*     (2006.01)
    *H01Q 21/20*     (2006.01)
    *H04B 7/185*     (2006.01)

(52) U.S. Cl.
    CPC ......... *H01Q 21/20* (2013.01); *H04B 7/18504* (2013.01)

(56) References Cited

U.S. PATENT DOCUMENTS

| | | |
|---|---|---|
| 2002/0128045 A1 | 9/2002 | Chang et al. |
| 2005/0035915 A1* | 2/2005 | Livingston .............. H01Q 1/422 343/754 |
| 2009/0289864 A1 | 11/2009 | Derneryd et al. |
| 2017/0301987 A1 | 10/2017 | Mack et al. |
| 2017/0346181 A1 | 11/2017 | Hojjat et al. |
| 2021/0226691 A1* | 7/2021 | Shimazaki ............ H04W 16/08 |

FOREIGN PATENT DOCUMENTS

| | | |
|---|---|---|
| JP | 11-88042 | 3/1999 |
| JP | 2008-523708 A | 7/2008 |
| JP | 2009-232213 A | 10/2009 |
| JP | 2018-127201 A | 8/2018 |
| JP | 2020-36070 A | 3/2020 |
| WO | WO 2020/045006 A1 | 3/2020 |

OTHER PUBLICATIONS

Hiroyuki Tsuji, et al., "The Development of Intelligent Beamforming Antenna Systems for Stratospheric Platforms in the Millimeter-Wave Band", Wireless Personal Communications (2005) 32 237-255.

* cited by examiner

SUPPRESSION OF REFLECTED WAVE INTERFERENCE FROM ANTENNA-MOUNTING PLATE IN SERVICE LINK OF HAPS

TECHNICAL FIELD

The present invention relates to a technology for suppressing a reflected wave interference from an antenna-mounting plate of a relay communication station such as a repeater or a base station apparatus in a service link of a communication relay apparatus such as a HAPS suitable for constructing a three-dimensional network.

BACKGROUND ART

There is conventionally known a communication relay apparatus such as a high altitude platform station (HAPS) (also referred to as "high altitude pseudo satellite") that can float and stay in an airspace. A communication line in this communication relay apparatus is configured with a feeder link between the communication relay apparatus and a gateway (GW) station on a mobile communication network side, and a service link between the communication relay apparatus and a terminal apparatus.

Patent Literature 1 discloses an aerial-staying type communication relay apparatus provided with an array antenna having plural antenna elements that form a cell for performing radio communication of a service link to and from a terminal apparatus, an information acquisition section for acquiring information on at least one of a position and attitude of a communication relay apparatus, and a control section for controlling phases and amplitudes of plural transmission and reception signals transmitted and received via each of the plural antenna elements of the array antenna so as to fix a position of footprint of the cell, based on the information on at least one of the position and attitude of the communication relay apparatus acquired by the information acquisition section. According to the communication relay apparatus, it is said that the apparatus can be downsized and the footprint can be fixed by suppressing the movement of the footprints of plural cells that make up the service area.

CITATION LIST

Patent Literature

Patent Literature 1: Japanese Unexamined Patent Publication No. 2020-036070

SUMMARY OF INVENTION

Technical Problem

In the aerial-staying type communication relay apparatus provided with the antenna of service link such as the array antenna, a part of radio waves radiated from the antenna may be reflected by an antenna-mounting member. When such reflection occurs, in the terminal apparatus on the footprint of the cell away from the communication relay apparatus, there is a problem that a superposition of a direct wave and the reflected wave from the communication relay apparatus occurs, a communication quality in the footprint of the cell deteriorates, and it is difficult to stably fix the footprint of the cell.

Solution to Problem

A communication relay apparatus according to an aspect of the present invention is an aerial-staying type communication relay apparatus for wirelessly communicating with a terminal apparatus. The communication relay apparatus comprises an antenna having plural antenna elements that form a cell for performing radio communication of a service link to and from the terminal apparatus and an antenna-mounting member to which the antenna is mounted, and a layer of radio wave absorber or a layer of frequency-selective electromagnetic shielding member that selectively shields a radio wave having a frequency of the service link is provided on an outer surface exposed to an outside of the antenna-mounting member.

In the foregoing communication relay apparatus, each of the plural antenna elements may be tilted so that a direction of an antenna directional beam perpendicular to an antenna main surface of the antenna element faces downward from a horizontal direction and supported by an antenna-main body support section.

A communication relay apparatus according to another aspect of the present invention is an aerial-staying type communication relay apparatus for wirelessly communicating with a terminal apparatus. The communication relay apparatus comprises an antenna having plural antenna elements that form a cell for performing radio communication of a service link to and from the terminal apparatus and an antenna-mounting member to which the antenna is mounted, and each of the plural antenna elements is tilted so that a direction of an antenna directional beam perpendicular to an antenna main surface of the antenna element faces downward from a horizontal direction and supported by an antenna-body support section.

In the foregoing communication relay apparatus, each of the plural antenna elements may be supported on an outer peripheral surface of the antenna-main body support section at a lower end portion, a central portion or an upper end portion of the antenna element, and may be tilted by rotating around a support position.

In the foregoing communication relay apparatus, each of the plural antenna elements may have a non-feeding element that narrows an antenna directional beam perpendicular to an antenna main surface of the antenna element.

A communication relay apparatus according to yet another aspect of the present invention is an aerial-staying type communication relay apparatus for wirelessly communicating with a terminal apparatus. The communication relay apparatus comprises an antenna having plural antenna elements that form a cell for performing radio communication of a service link to and from the terminal apparatus and an antenna-mounting member to which the antenna is mounted, and each of the plural antenna elements has a non-feeding element that narrows a main beam perpendicular to an antenna main surface of the antenna element.

In the foregoing communication relay apparatus, the communication relay apparatus may further comprise a control section for controlling phases and amplitudes of plural transmission and reception signals transmitted and received via each of the plural antenna elements of the array antenna, and the control section may determine a target beam width, a target horizontal angle and a target vertical angle of an antenna directional beam from the communication relay apparatus toward a center of the cell so as to fix a position of a footprint of the cell with reference to an orientation in a reference direction preset in the communication relay apparatus, and control phases and amplitudes of plural transmission and reception signals transmitted and received via each of the plural antenna elements of the array antenna so as to form an antenna directional beam having the target beam width, the target horizontal angle and the target vertical angle, based on a composite beam pattern that combines a beam pattern of a direct wave of each of the plural antenna elements and a beam pattern of a reflected wave by the antenna-mounting member.

A communication relay apparatus according to yet another aspect of the present invention is an aerial-staying type communication relay apparatus for wirelessly communicating with a terminal apparatus. The communication relay apparatus comprises an antenna having plural antenna elements that form a cell for performing radio communication of a service link to and from the terminal apparatus, an antenna-mounting member to which the antenna is mounted, and a control section for controlling phases and amplitudes of plural transmission and reception signals transmitted and received via each of the plural antenna elements of the array antenna, and the control section determines a target beam width, a target horizontal angle and a target vertical angle of an antenna directional beam from the communication relay apparatus toward a center of the cell so as to fix a position of a footprint of the cell with reference to an orientation in a reference direction preset in the communication relay apparatus, and controls phases and amplitudes of plural transmission and reception signals transmitted and received via each of the plural antenna elements of the array antenna so as to form an antenna directional beam having the target beam width, the target horizontal angle and the target vertical angle, based on a composite beam pattern that combines a beam pattern of a direct wave of each of the plural antenna elements and a beam pattern of a reflected wave by the antenna-mounting member.

In the foregoing communication relay apparatus, the communication relay apparatus may calculate weights to be applied respectively to the plural transmission and reception signals for the plural antenna elements so as to form an antenna directional beam having the target beam width, the target horizontal angle and the target vertical angle, based on the composite beam pattern that combines the beam pattern of the direct wave of each of the plural antenna elements and the beam pattern of the reflected wave by the antenna-mounting member, and control the phases and amplitudes of the plural transmission and reception signals based on the plural weights.

In the foregoing communication relay apparatus, the antenna may be a cylinder type antenna having plural antenna elements disposed so as to be distributed along an outer peripheral surface of a main body having a cylindrical peripheral surface shape or a polygonal prism peripheral surface shape. The cylinder type antenna may be configured with plural sets of circular type array antennas, each of which has plural antenna elements disposed in a circumferential direction of the outer peripheral surface of the main body having the cylindrical peripheral surface shape or the polygonal prism peripheral surface shape, and the plural sets of circular type array antennas are disposed in a direction parallel to a central axis of the main body. The antenna may be one or plural planar antennas in which plural antenna elements are disposed on a plane.

Advantageous Effects of Invention

According to the present invention, a fluctuation of directivity pattern due to reflection on the antenna-mounting member, to which the antenna of service link of the aerial-staying type communication relay apparatus is mounted, can be suppressed, a footprint of cell can be stably fixed, and as a result, a deterioration of communication quality can be prevented.

DESCRIPTION OF EMBODIMENTS

Hereinafter, embodiments of the present invention are described with reference to the drawings.

Figure 1:
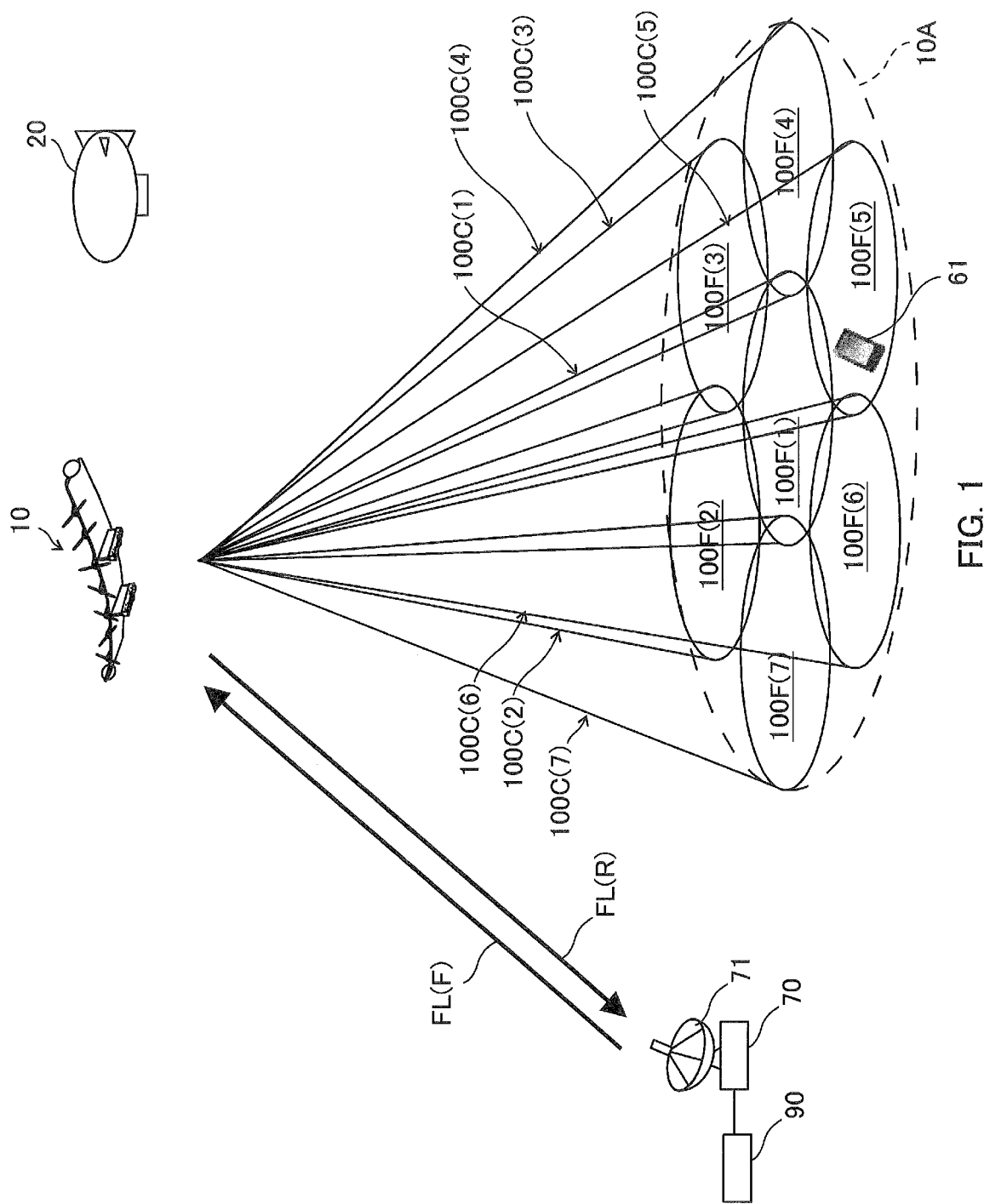
FIG. 1 is a schematic configuration diagram showing an example of an overall configuration of a communication system that realizes a three-dimensional network according to an embodiment of the present invention.

FIG. 1 is an illustration showing an example of a cell configuration of a HAPS 10 in a communication system according to an embodiment of the present invention. The communication system according to the present embodiment is suitable for realizing a three-dimensional network of the fifth-generation or later generation mobile communication that supports a simultaneous connection to a large number of terminal apparatuses, and a low delay, etc. The mobile communication standards applicable to communication systems, radio relay stations, base stations, repeaters and terminal apparatuses disclosed in the present specification include the fifth-generation mobile communication standard and subsequent next generation mobile communication standards after and the fifth-generation.

As shown in FIG. 1, the communication system is provided with High-Altitude Platform Stations (HAPS) (also called "high altitude pseudo satellite" or "stratified platform") 10 as plural aerial-floating type communication relay apparatuses (radio relay apparatuses). The HAPS 10 is located in an airspace at a predetermined altitude, and forms a three-dimensional cell (three-dimensional area) in a cell-formation target airspace at a predetermined altitude. The HAPS 10 is a solar plane as a floating object that is controlled by autonomous control or external control so as to float or fly and be located in an airspace (floating airspace) with high altitude of 100 [km] or less from the ground level or the sea level, in which a relay communication station 110 is mounted.

The airspace in which the HAPS 10 is located is, for example, a stratospheric airspace with altitude of 11 [km] or more and 50 [km] or less on the ground (or on the water such as the sea or lake). The airspace may be an airspace with altitude of 15 [km] or more and 25 [km] or less where weather conditions are relatively stable, and may be an airspace with altitude of about 20 [km] in particular.

The cell-formation target airspace, where is a target airspace for forming a three-dimensional cell with one or two or more HAPSs in the communication system of the present embodiment, is an airspace within a predetermined altitude range (for example, altitude range of 50 [m] or more and 1000 [m] or less) located between the airspace where the HAPS 10 is located and a cell-formation spatial area near the ground level covered by a base station (for example, LTE eNodeB) such as a conventional macro-cell base station.

It is noted that, the cell-formation target airspace, where the three-dimensional cell is formed in the present embodiment, may be an airspace over the sea, a river or a lake. Further, the three-dimensional cell formed by the HAPS 10 may be formed so as to reach the ground level or the sea level so that the HAPS can communicate with a terminal apparatus 61 located on the ground or on the sea.

Each of the relay communication stations 110 of the HAPSs 10 forms plural antenna directional beams (hereinafter, also called "beam" for short.) for wirelessly communicating with the terminal apparatus 61 that is a mobile station, toward the ground by an antenna for service link (hereinafter referred to as "SL antenna"). The terminal apparatus 61 may be a communication terminal module incorporated in a drone that is an aircraft such as a small helicopter capable of remotely steering, or may be a user apparatus used by a user in an airplane. In the cell-formation target airspace, an area through which the beam passes is a three-dimensional cell. In the cell-formation target airspace, the plural beams adjacent to each other may be partially overlapped.

Each of the relay communication stations 110 of the HAPSs 10 is, for example, a base station that wirelessly communicates with a gateway station (also referred to as a "feeder station") 70 as a relay station connected to a core network on the ground (or on the sea) side, or a slave repeater that wirelessly communicates with the feeder station (master repeater) 70 as a relay station connected to a base station on the ground (or on the sea) side.

The relay communication station 110 may be a base station having a function such as eNodeB or gNodeB. In this case, a backhaul line of the relay communication station 110 as the base station is set in the feeder link.

The relay communication station 110 of the HAPS 10 is connected to a core network of a mobile communication network 80 via the feeder station 70 installed on the ground or on the sea, to which a radio communication can be performed by an antenna for feeder link (hereinafter referred to as "FL antenna"). A communication of feeder link between the HAPS 10 and the feeder station 70 may be performed by a radio communication using a radio wave such as a microwave or a millimeter wave, or may be performed by an optical communication using a laser light or the like.

Each of the HAPSs 10 may autonomously control its own floating movement (flight) and a process in the relay communication station 110 by executing a control program by a control section configured with a computer, etc. built in the inside. For example, each of the HAPSs 10 may acquire its own current position information (for example, GPS position information), position control information (for example, flight schedule information) stored in advance, position information on another HAPS located in a peripheral space, or the like, and may autonomously control the floating movement (flight) and the process in the relay communication station 110 based on these pieces of information.

The floating movement (flight) of each of the HAPSs 10 and the process in the relay communication station 110 may be controlled by a management apparatus (also referred to as a "remote control apparatus") as a management apparatus provided in a communication center or the like of the mobile communication network. The management apparatus can be configured with, for example, a computer apparatus such as a PC, a server, or the like. In this case, the HAPS 10 may incorporate a communication terminal apparatus for control (for example, mobile communication module) so as to receive control information from the management apparatus and transmit various pieces of information such as monitoring information to the management apparatus, and may be assigned with terminal identification information (for example, IP address, phone number, etc.) so as to be identified from the management apparatus. The MAC address of the communication interface may be used to identify the communication terminal apparatus for control.

Each of the HAPSs 10 may transmit information on the floating movement (flight) of the HAPS itself or a surrounding HAPS and the process at the relay communication station 110, and monitoring information such as information on the status of the HAPS 10 and observation data acquired by various kinds of sensors, to a predetermined destination such as the management apparatus. The control information may include information on the target flight route of the HAPS 10. The monitoring information may include at least one of information on a current position, flight-route history information, velocity relative to the air, velocity relative to the ground and propulsion direction of the HAPS 10, wind velocity and wind direction around the HAPS 10, and an atmospheric pressure and a temperature around the HAPS 10.

Duplex methods of uplink and downlink for a radio communication between the relay communication station 110 and the terminal apparatus 61 are not limited to specific methods, and may be, for example, a time division duplex method (Time Division Duplex: TDD) or a frequency division duplex method (Frequency Division Duplex: FDD). An access method for a radio communication between the relay communication station 110 and the terminal apparatus 61 is not limited to the specific method, and may be, for example, FDMA (Frequency Division Multiple Access) method, TDMA (Time Division Multiple Access) method, CDMA (Code Division Multiple Access) method, or OFDMA (Orthogonal Frequency Division Multiple Access). In the foregoing radio communication, a MIMO (Multi-Input and Multi-Output) technology may be used, which has functions of a diversity coding, a transmission beam forming, a spatial division multiplexing (SDM: Spatial Division Multiplexing), etc., and in which a transmission capacity per unit frequency can be increased by simultaneously using plural antennas for both of transmission and reception. The MIMO technology may be an SU-MIMO (Single-User MIMO) technology in which one base station transmits plural signals to one terminal apparatus on the same time and the same frequency, and may be an MU-MIMO (Multi-User MIMO) technology in which one base station transmits signals to plural different communication terminal apparatuses on the same time and the same frequency or plural different base stations transmit signals to one terminal apparatus on the same time and the same frequency.

A link between the HAPS 10 and a ground base station via the gateway station (hereinafter abbreviated as "GW station") 70 as the feeder station is referred to as a "feeder link", and a link between the HAPS 10 and the terminal apparatus 61 is referred to as a "service link". In particular, a section between the HAPS 10 and the GW station 70 is referred to as a "radio section of feeder link". Further, a downlink of communication from the GW station 70 to the terminal apparatus 61 via the HAPS 10 is referred to as a "forward link", and an uplink of communication from the terminal apparatus 61 to the GW station 70 via the HAPS 10 is also referred to as a "reverse link".

In the example of FIG. 1, the HAPS 10 is located in the stratosphere at an altitude of about 20 km, the HAPS 10 forms plural cells 100C(1) to 100C(7), and the diameter of the service area 10A consisting of footprints 100F(1) to 100F(7) of the cells 100C(1) to 100C(7) having plural cells (7 cells) configuration is 100 to 200 km, but the configuration is not limited to these examples.

Figure 2:
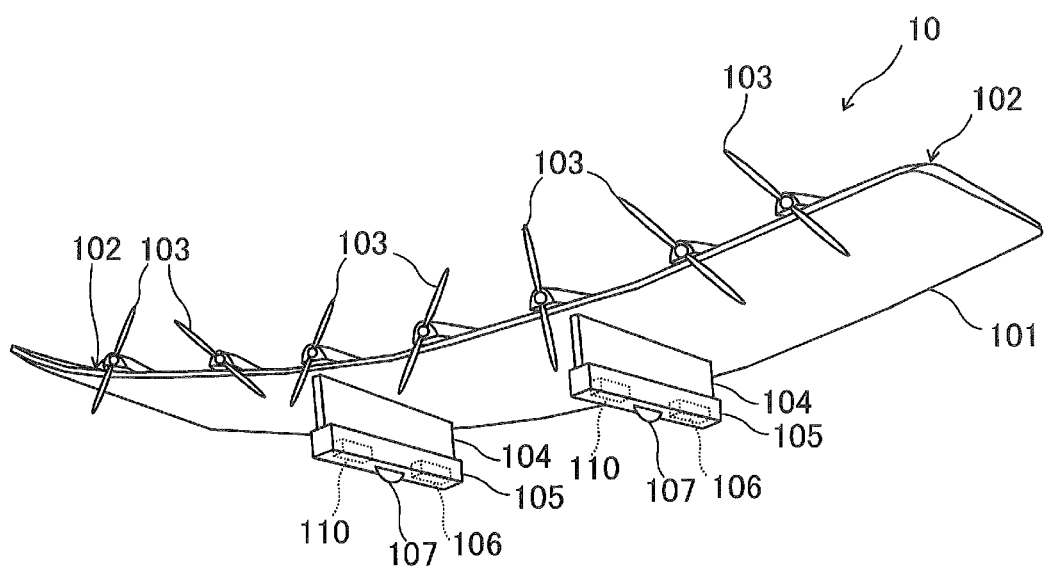
FIG. 2 is a perspective view showing an example of a HAPS used in a communication system according to an embodiment.

FIG. 2 is a perspective view showing an example of a HAPS 10 used in a communication system of an embodiment.

The HAPS 10 in FIG. 2 is a solar-plane type HAPS, and is provided with a main wing section 101 with both ends in the longitudinal direction along the upper side, and plural motor-driven propellers 103 as propulsion apparatuses for a bus power system at one end edge of the main wing section 101 in the lateral direction. A solar-power generation panel (hereinafter referred to as "solar panel") 102 as a solar-power generation section having a solar-power generation function is provided on the upper surface of the main wing section 101. Pods 105 as plural equipment accommodating sections for accommodating mission equipment are connected to two locations in the longitudinal direction of the lower surface of the main wing section 101 via plate-shaped connecting sections 104. Inside each pod 105, a relay communication station 110 as a mission apparatus and a battery 106 are housed. Further, a wheel 107 used for takeoff and landing is provided on the lower surface side of each pod 105. The electric power generated by the solar panel 102 is stored in the battery 106, and the motors of propellers 103 are rotationally driven by the electric power supplied from the battery 106, and the radio relay process is executed by the relay communication station 110.

The relay communication station 110 has a main body apparatus that mainly performs radio relay processing, an SL antenna used for radio communication between the terminal apparatus 61, and an FL antenna used for radio communication between the feeder station 70.

The solar-plane type HAPS 10 can float by lift, for example, by making a turning flight in a circular shape, a "D"-shaped flight, and a "8"-shaped flight based on a predetermined target flight route, and can float to stay in a predetermined range in the horizontal direction at a predetermined altitude. The solar-plane type HAPS 10 can also fly like a glider when the propellers 103 are not rotationally driven. For example, the solar-plane type HAPS 10 can rise to a high position when the power of the battery 106 has surplus power due to the power generation of the solar panel 102 such as in the daytime, and can fly like a glider by stopping the power supply from the battery 106 to the motor when the solar panel 102 cannot generate power such as in the night.

Figure 3:
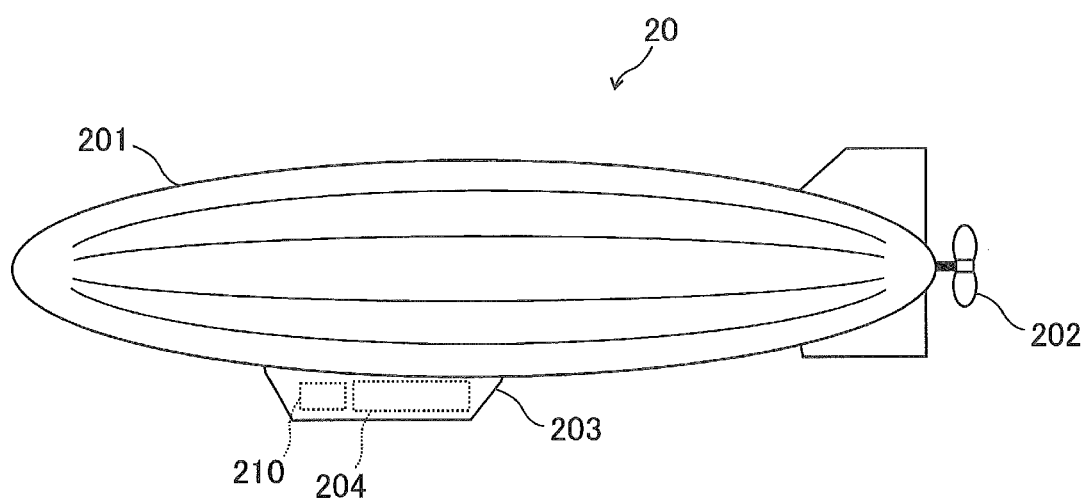
FIG. 3 is a side view showing another example of a HAPS used in a communication system according to an embodiment.

FIG. 3 is a perspective view showing another example of a HAPS 20 used in a communication system of an embodiment.

The HAPS 20 in FIG. 3 is an unmanned-airship type HAPS and can be equipped with a large capacity battery because of its large payload. The HAPS 20 is provided with an airship main body 201 filled with a gas such as helium gas for floating by buoyancy, a motor-driven propeller 202 as a propulsion apparatus for a bus power system, and an equipment accommodating section 203 for accommodating mission equipment. A relay communication station 210 and a battery 204 are housed inside the equipment accommodating section 203. The motor of the propeller 202 is rotationally driven by the electric power supplied from the battery 204, and the radio relay process by the relay communication station 210 is executed. A solar panel having a solar-power generation function may be provided on the upper surface of the airship main body 201, and the power generated by the solar panel may be accumulated in the battery 204.

The relay communication station 210 has a main body apparatus for mainly performing radio relay process, an SL antenna used for radio communication between the terminal apparatus 61, and an FL antenna used for radio communication between the feeder station 70.

In the description of the following embodiments, although the case where the communication relay apparatus for performing a radio communication with the terminal apparatus 61 is the solar-plane type HAPS 10 is illustrated and described, the communication relay apparatus may be the unmanned-airship type HAPS 20. The following embodiments can be similarly applied to other aerial-floating type communication relay apparatuses other than the HAPSs 10 and 20.

Figure 4:
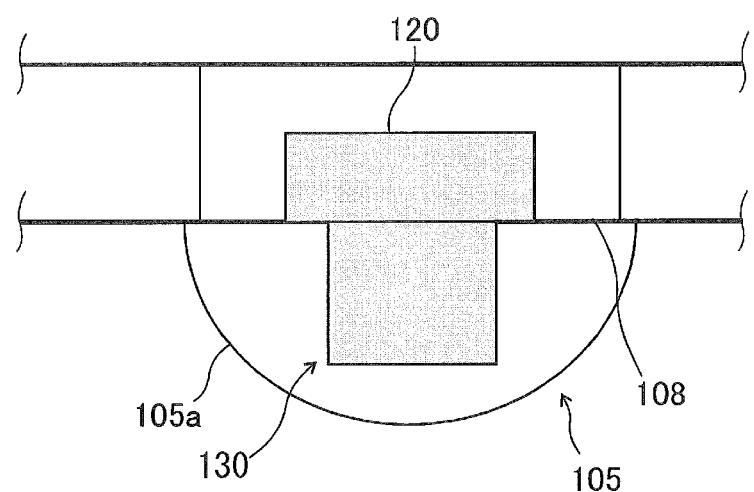
FIG. 4 is a cross-sectional view showing an example of a configuration of a mounting section of an antenna for a service link of a HAPS according to an embodiment.

FIG. 4 is a cross-sectional view of an example of a configuration of a mounting portion of an SL antenna 130 of the HAPS 10 according to an embodiment. In FIG. 4, the SL antenna 130 is housed inside a resin fairing 105a which is an outer wall of the pod 105 described above, and is attached to a lower surface of a plate-shaped antenna-mounting member 108 provided so as to partition the internal space of the pod 105. The main body apparatus 120 of the relay communication station 110 is mounted on the upper surface of the antenna-mounting member 108. The antenna-mounting member 108 is made of, for example, a carbon-fiber reinforced resin that can provide high strength and reduce weight.

Figure 5:
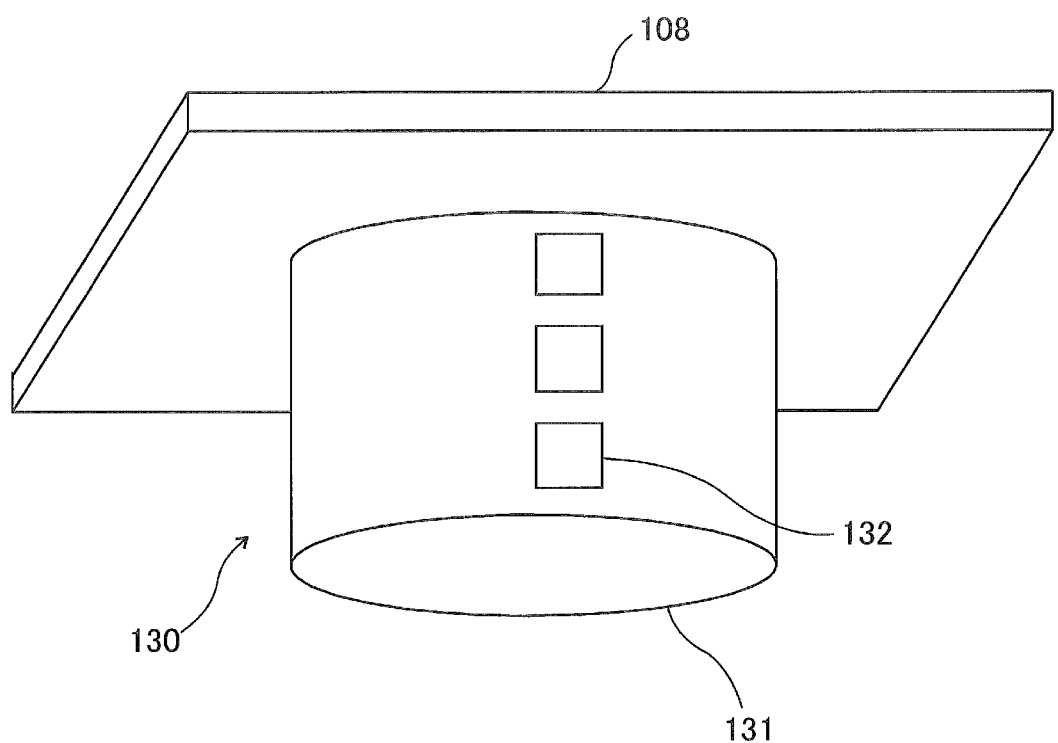
FIG. 5 is a cross-sectional view showing an example of a configuration of an antenna for a service link of a HAPS according to an embodiment.

FIG. 5 is a cross-sectional view showing an example of a configuration of the SL antenna 130 of the HAPS 10 according to an embodiment. In FIG. 5, the SL antenna 130 is a cylinder-type array antenna suitable for a footprint-fixing control, in which plural antenna elements 132 are disposed so as to be distributed along an outer peripheral surface of an antenna-main body support section 131 having a cylindrical-peripheral surface shape or a polygonal-prism peripheral surface shape. In particular, the SL antenna 130 of the present embodiment has a configuration in which plural sets of circular array antennas, each of which has plural antenna elements are disposed in the circumferential direction of the outer peripheral surface of the antenna-main body support section 131 having the cylindrical-peripheral surface shape or the polygonal-prism peripheral surface shape, and the plural sets of circular type array antennas are disposed in a direction parallel to the central axis of the antenna-main body support section 131. That is, in the SL antenna 130, the antenna elements 132 are disposed in a circle (circular array) so that the shape of the antenna does not change when viewed from any direction in the horizontal direction, and the antenna elements 132 are linearly disposed in order to correspond to the longitudinal beam direction control in the vertical direction. The antenna element 132 is, for example, a planar antenna (patch antenna) capable of efficiently transmitting and receiving linearly polarized radio waves, which has feeding points at two predetermined points deviated from a center of an antenna main surface. An antenna such as the planar array antenna for generating the cell in the direction directly below the HAPS 10 may be provided at the bottom of the SL antenna 130.

Figure 6:
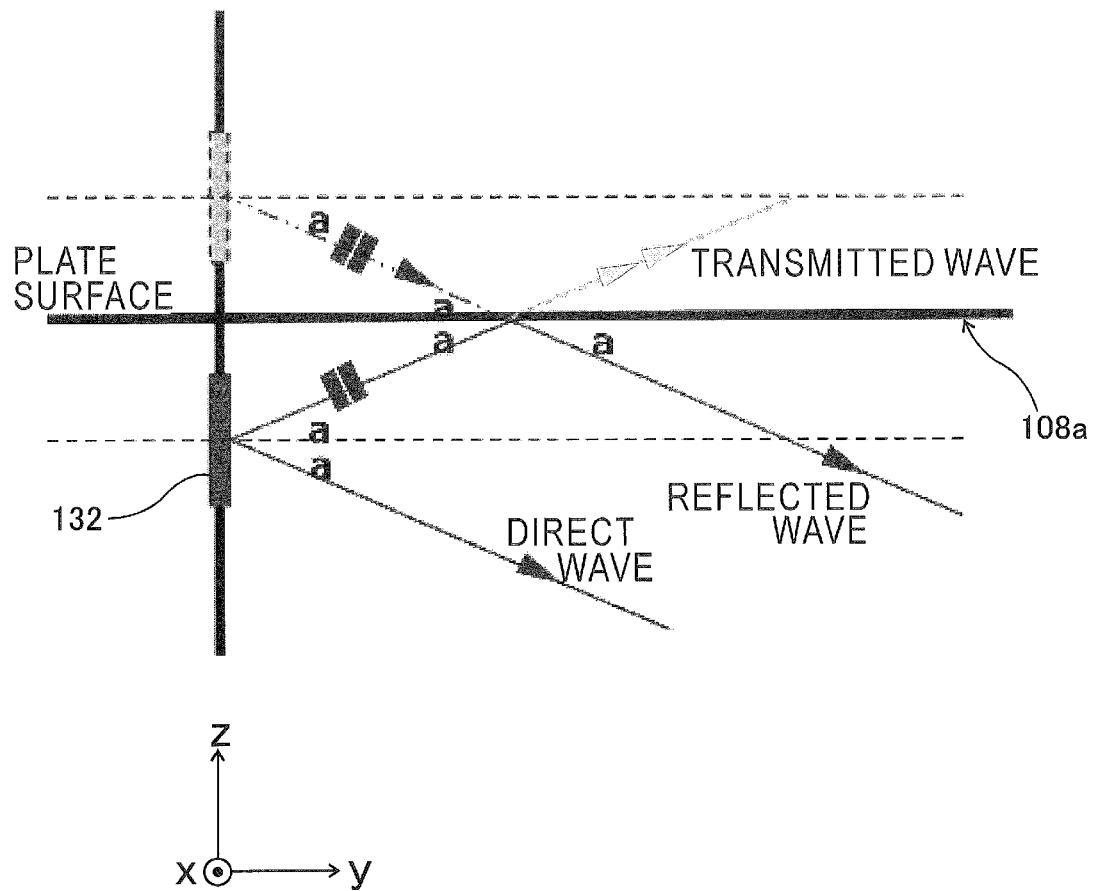
FIG. 6 is an illustration showing an example of a relationship between a direct wave and a reflected wave of an antenna for service link.
Figure 7:
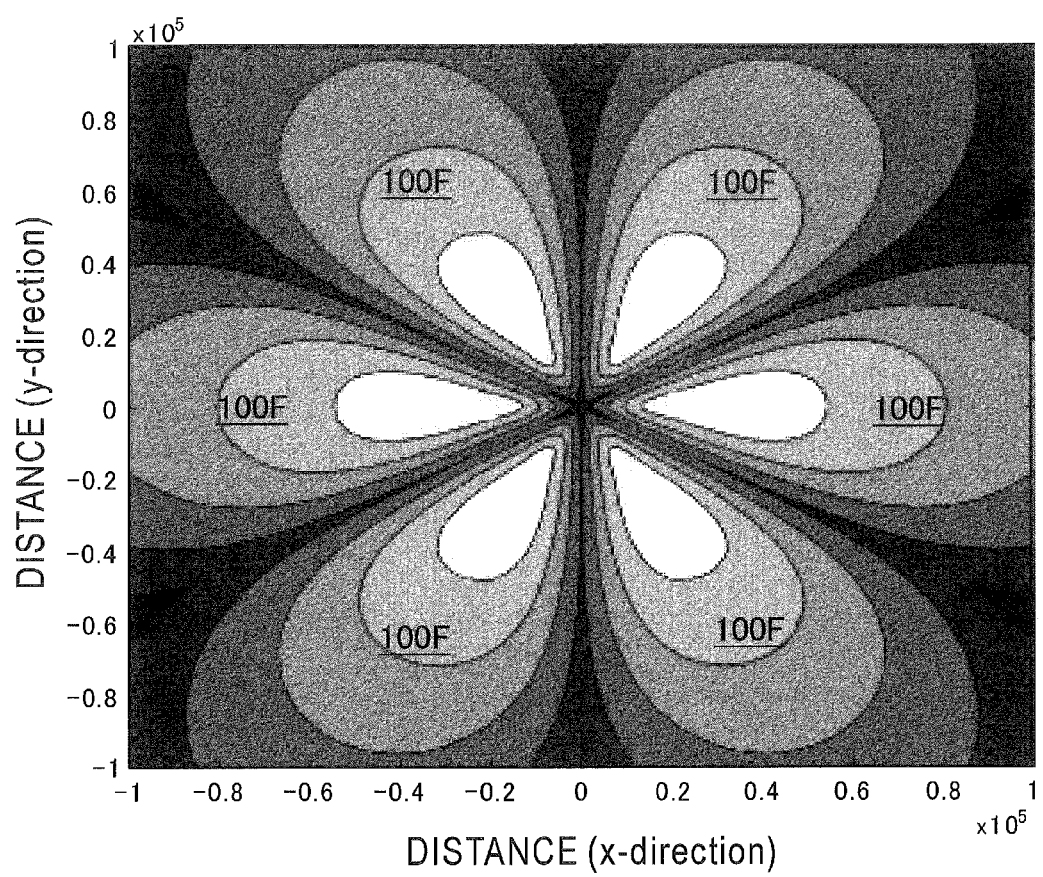
FIG. 7 is an illustration showing an example of a footprint by a cell formed by an antenna for service link.

In the HAPS 10 with the above configuration, since the antenna-mounting member 108, to which the SL antenna 130 is attached, is made of a conductive carbon-fiber reinforced resin, a part of the beam of radio waves radiated from the antenna element 132 of the SL antenna 130 may be reflected by a surface 108a of the antenna-mounting member 108 as shown in FIG. 6. When the reflection occurs by the antenna-mounting member 108, in the far distance where the terminal apparatus 61 on the footprint 100F (see FIG. 1 and FIG. 7) of the cell on the ground away from the HAPS 10 is located, a superposition of the direct wave and the reflected wave from the HAPS 10 occurs.

The SL antenna 130 may be one or plural planar antennas in which plural antenna elements are disposed on a plane.

Figure 8:
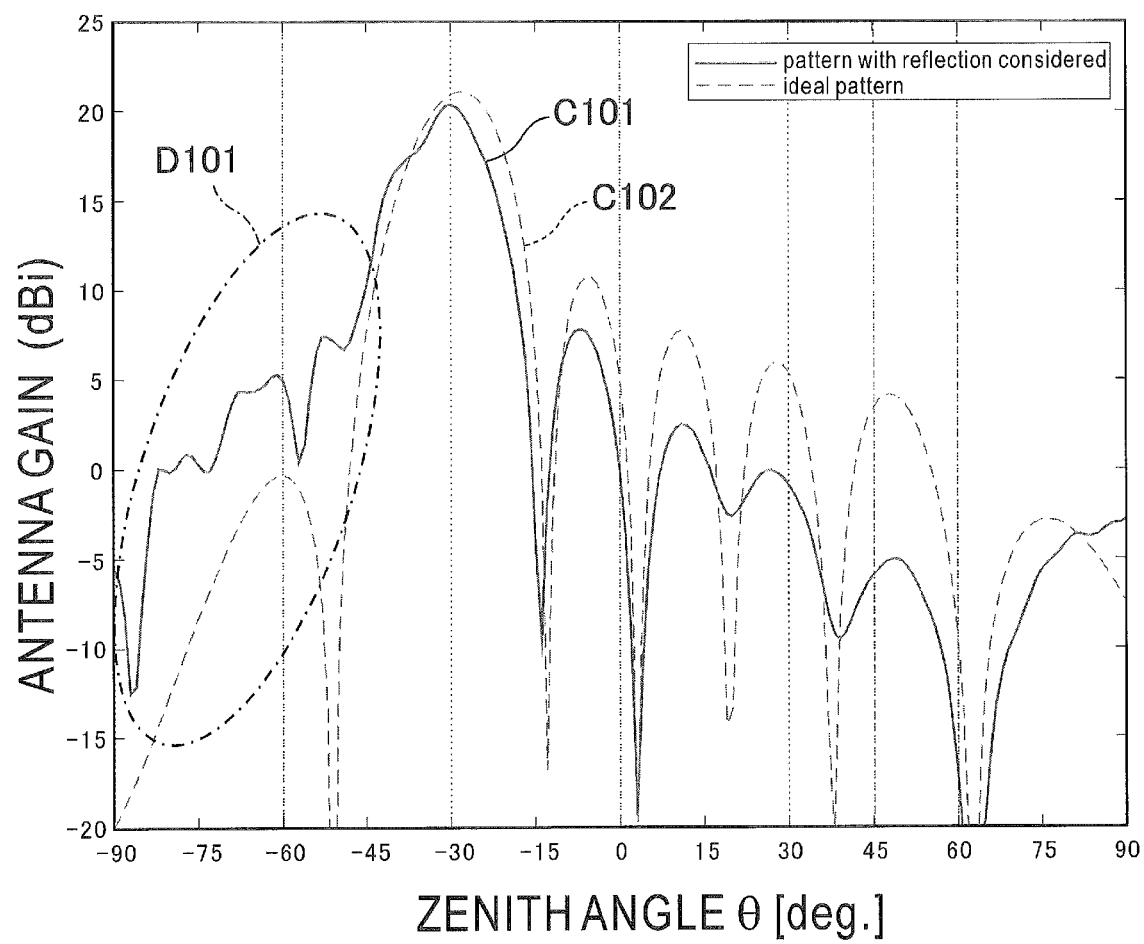
FIG. 8 is a graph showing an example of an influence of a reflected wave on directivity characteristics of an antenna for service link.
Figure 9:
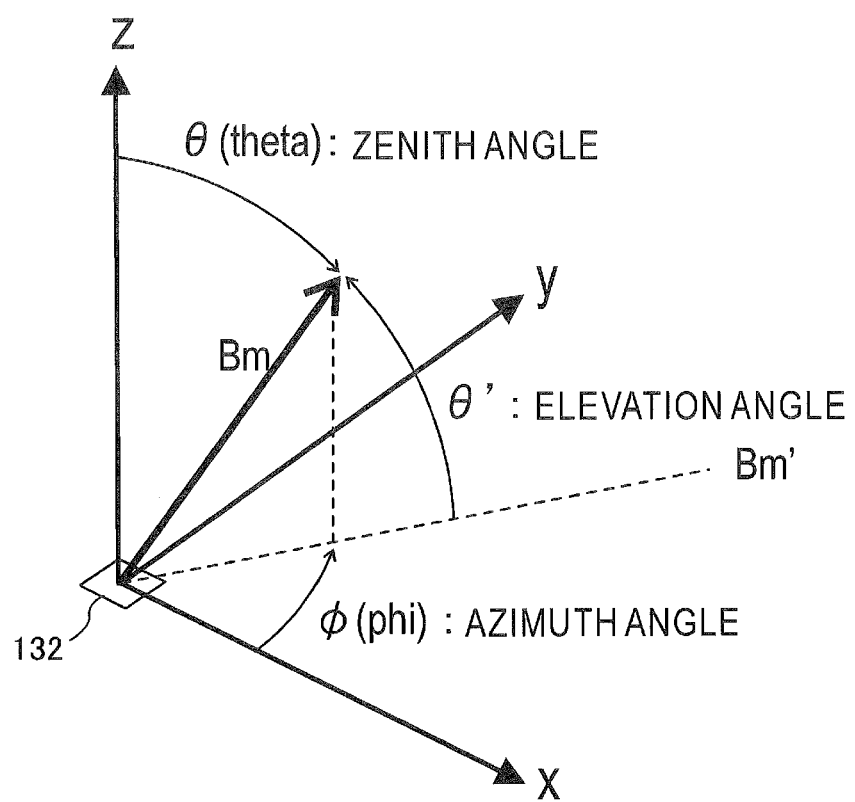
FIG. 9 is an illustration of a coordinate system showing definitions of a zenith angle θ and an azimuth angle 9 in a directivity of an antenna for service link.

FIG. 8 is a graph of a result of a computer simulation showing an example of an influence of a reflected wave on directivity characteristics (beam pattern) of the SL antenna 130. FIG. 9 is an illustration of a coordinate system showing definitions of a zenith angle (also referred to as "vertical angle") θ and an azimuth angle (also called "horizontal angle" or "steering angle") φ in the directivity of the SL antenna 130. In the x, y, z coordinate system of FIG. 9, a central part of the antenna element 132 of the SL antenna 130 is located at the origin, and an angle in a direction of a beam Bm with respect to a positive direction (zenith direction) of the z-axis (downward angle in the figure is positive) is the zenith angle θ [deg.]. An angle in a direction of the beam Bm with respect to a beam projection direction Bm' in which the beam Bm is projected onto the x-y plane (upward angle in the figure is plus) is an elevation angle θ' [deg.] (=90 [deg.]−θ). Further, an angle of a direction of the beam projection direction Bm' with respect to a plus direction of the x-axis in the x-y plane (horizontal plane) (angle in a left rotation direction in the figure is plus) is the azimuth φ (also referred to as "horizontal argument") [deg.]. In the illustrated example, the azimuth φ of the +x-axis direction is 0 [deg.], and the azimuth angle φ of the +y-axis direction is 90 [deg.].

FIG. 8 shows a result of calculating the gain [dBi] of the SL antenna 130 at a distance where the zenith angle θ defined in FIG. 9 is sufficiently far from the SL antenna 130 in the range of −90 [deg.] (vertical direction toward the ground) to +90 [deg.] (vertical direction toward the zenith), by using a computer simulation. A curve C101 in the figure is a pattern of directivity characteristics in consideration of reflection on the surface 108a of the antenna-mounting member 108, and a curve C102 is an ideal pattern of directivity characteristics when there is no reflection. As shown in directivity characteristics in a region surrounded by D101 in FIG. 8, in a range of the zenith angle θ toward the ground, the superposition of the direct wave and the reflected wave occurs at a distance such as the ground sufficiently far from the SL antenna 130, so that the antenna gain C101 greatly fluctuates and the beam is disturbed. As a result, in addition to not being able to communicate with sufficient quality in the footprint 100F of the cell, the footprint 100F of the cell cannot be fixed (varies) when the movement or attitude change of the HAPS 10 occurs.

Therefore, in the HAPS 10 of the present embodiment, as described below, it is provided with various kind of anti-reflection measure configurations for suppressing the influence of reflection by the antenna-mounting member 108 and suppressing the deterioration of communication quality in the footprint 100F of the cell, and stably fixing the footprint 100F of the cell.

Configuration Example 1 of Anti-Reflection Measure

Figure 10A:
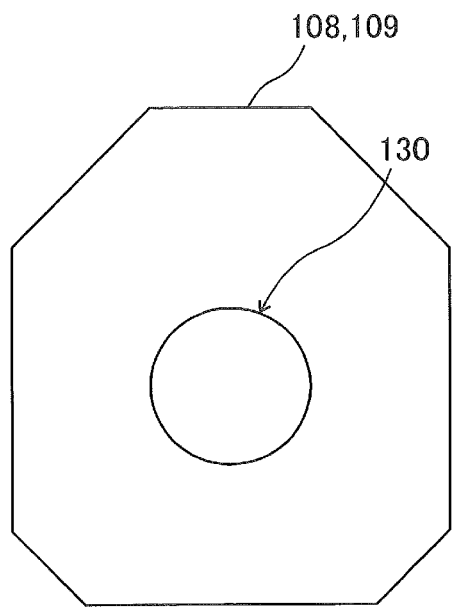
FIG. 10A is a bottom view showing an example of a configuration of antenna-mounting member and an antenna for service link of a HAPS according to an embodiment.
Figure 10B:
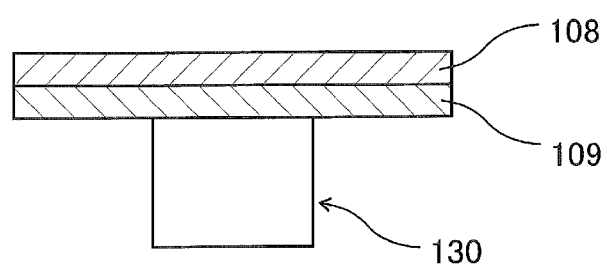
FIG. 10B is a side sectional view showing an example of a configuration of an antenna-mounting member and an antenna for service link of a HAPS according to an embodiment.

Each of FIG. 10A and FIG. 10B is a bottom view and a side sectional view showing an example of a configuration of the antenna-mounting member 108 and the SL antenna 130 of the HAPS 10 according to an embodiment. In the present configuration example, a layer of radio wave absorber 109 is formed by attaching a sheet-shaped radio wave absorber 109 with many protrusions on the surface, to the surface of the antenna-mounting member 108 on the SL antenna 130 side. By providing the layer of radio wave absorber 109 on the surface of the antenna-mounting member 108 in this way, it is possible to prevent the radio waves radiated from the SL antenna 130 from being reflected by the antenna-mounting member 108. Accordingly, the fluctuation of the directivity pattern due to the reflection on the antenna-mounting member 108 can be suppressed, the footprint of the cell can be stably fixed, and as a result, the deterioration of the communication quality can be prevented.

Figure 11:
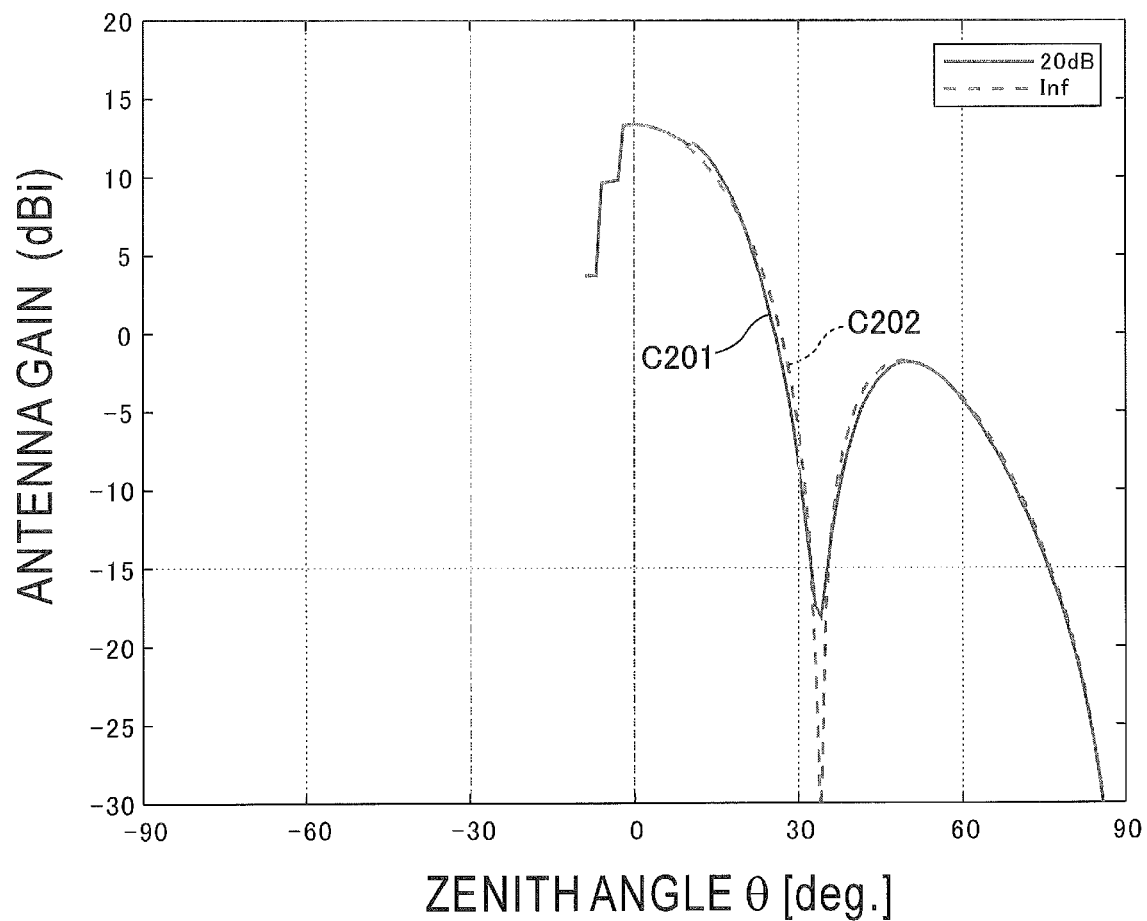
FIG. 11 is a graph showing an example of directivity characteristics of an antenna for service link when a layer of radio wave absorber is provided on a surface of an antenna-mounting member of a HAPS according to an embodiment.
Figure 12:
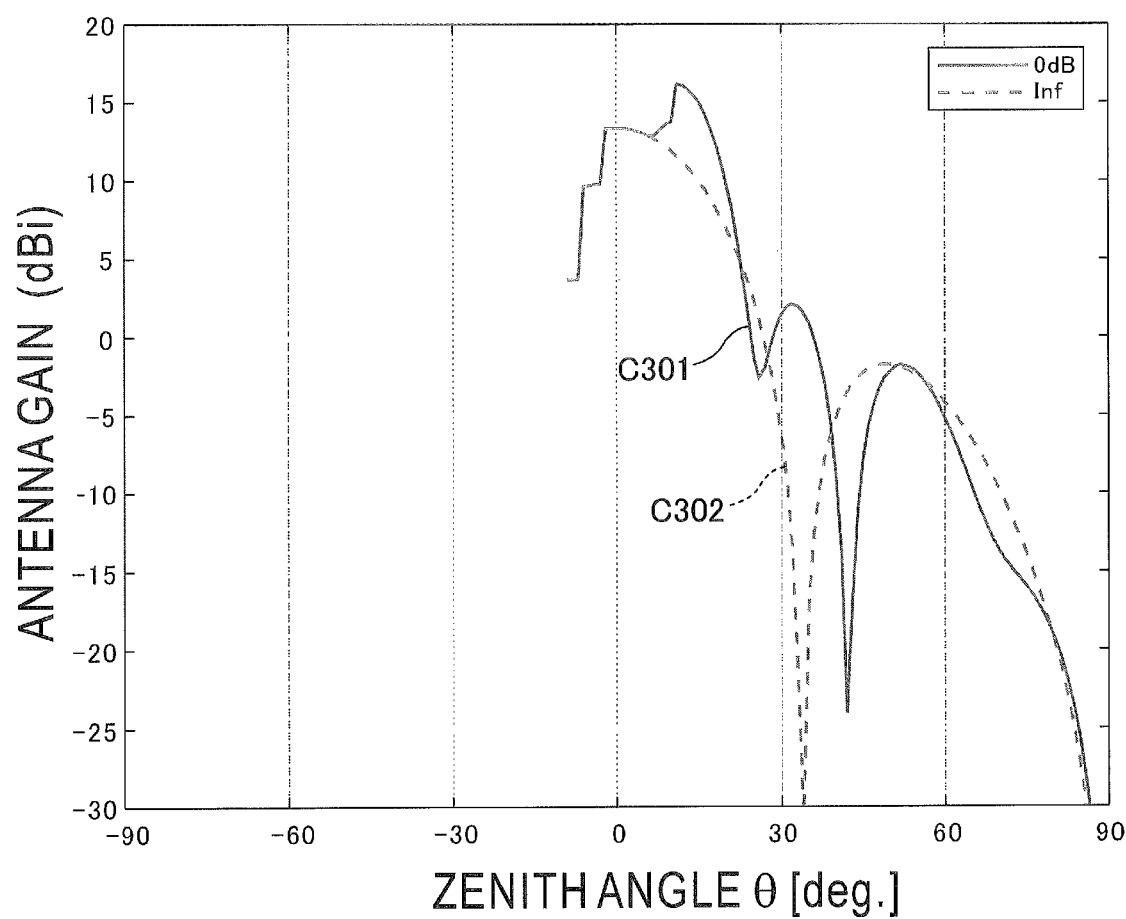
FIG. 12 is a graph showing an example of directivity characteristics of an antenna for service link when a layer of radio wave absorber is not provided on a surface of an antenna-mounting member according to a reference comparative example.

FIG. 11 is a graph showing an example of the directivity characteristics of the SL antenna 130 when the layer of radio wave absorber 109 is provided on the surface of the antenna-mounting member 108 of the HAPS 10 according to an embodiment. FIG. 12 is a graph showing an example of the directivity characteristics of the SL antenna when the layer of radio wave absorber is not provided on the surface of the antenna-mounting member 108 according to a reference comparative example. Each of FIG. 11 and FIG. 12 shows a calculation result by a computer simulation performed assuming a linear array antenna considering a reflection by antenna-mounting member having a finite length, and shows a direction (direction facing the ground) in which the plus side of the zenith angle θ on the horizontal axis in the figure faces downward from the horizontal direction. In the calculation of FIG. 11, the absorption of radio waves by the radio wave absorber 109 is set to 20 [dB]. When the layer of radio wave absorber 109 is provided, the beam pattern substantially similar to the curve C202 shown by the broken line in the case of no reflection is obtained, as shown in the curve C201 of FIG. 11. On the other hand, when the layer of radio wave absorber 109 is not provided, the beam pattern is greatly deviated from the curve C302 shown by the broken line in the case of no reflection, as shown in the curve C301 of FIG. 12.

It is noted that the radio wave absorber 109 may be attached to the entire surface of the surface of the antenna-mounting member 108 to which the SL antenna 130 is attached, and may be partially attached to a part of the surface of the antenna-mounting member 108 (for example, a portion where the radio wave radiated from the SL antenna 130 is easily reflected.). Instead of the radio wave absorber 109, a frequency-selective electromagnetic shielding member (FSS) may be attached, which selectively shields radio waves of a specific frequency. In this case, it is also possible to prepare different types of frequency-selective electromagnetic shielding members (FSS) according to each of the frequency of transmission (downlink) of the service link and the frequency of reception (uplink) of the service link, and attach them separately.

Configuration Example 2 of Anti-Reflection Measures

Figure 13A:
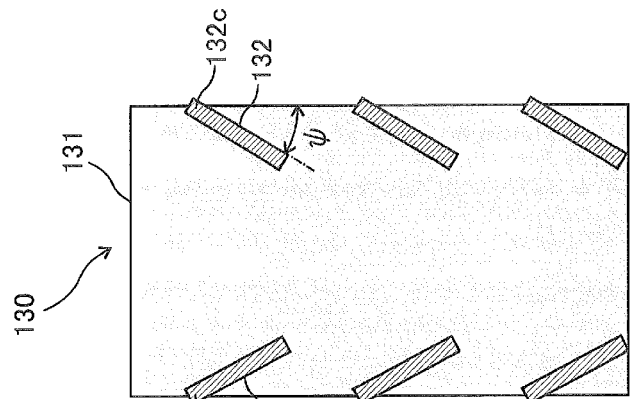
FIG. 13A is a vertical sectional view showing another configuration example of an antenna for service link of a HAPS according to an embodiment.
Figure 13B:
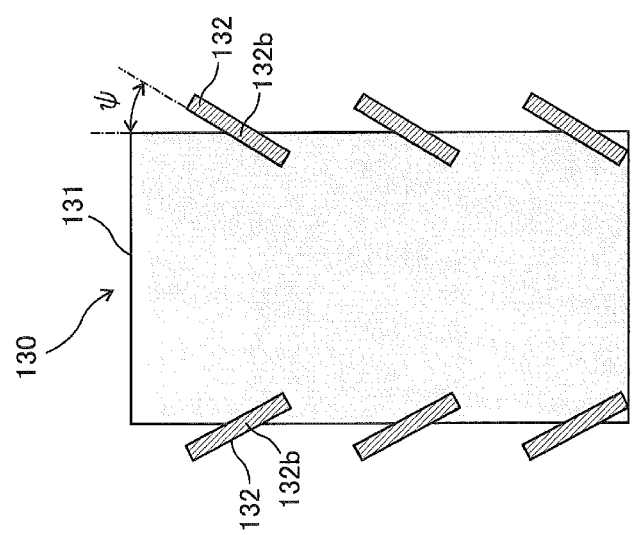
FIG. 13B is a vertical sectional view showing another configuration example of an antenna for service link of a HAPS according to an embodiment.
Figure 13C:
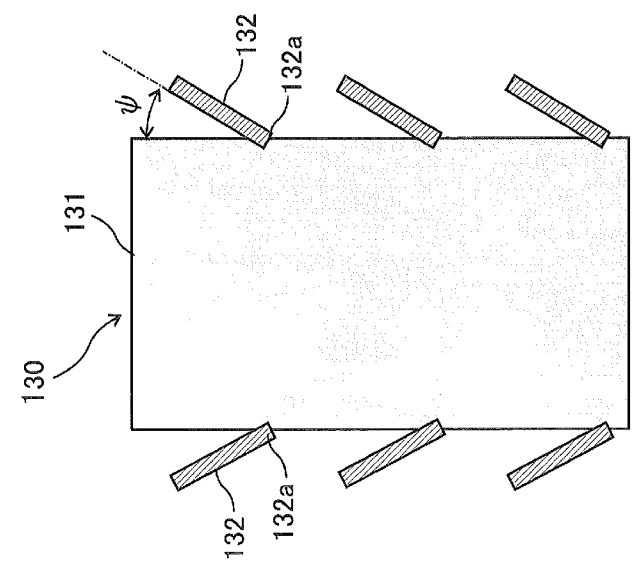
FIG. 13C is a vertical sectional view showing another configuration example of an antenna for service link of a HAPS according to an embodiment.

Each of FIG. 13A, FIG. 13B and FIG. 13C is a vertical cross-sectional view showing another configuration example of the SL antenna 130 of the HAPS 10 according to an embodiment. In the present configuration example, each of the plural antenna elements 132 of the SL antenna 130 is tilted by a predetermined angle ψ so that the direction of the beam Bm perpendicular to the antenna main surface of each antenna element (planar antenna) 132 is downward from the horizontal direction, and supported by the antenna-main body support section 131. By tilting each antenna element 132 in this way, it is possible to prevent the radio waves radiated from the SL antenna 130 from being reflected by the antenna-mounting member 108. Accordingly, the fluctuation of the directivity pattern due to the reflection on the antenna-mounting member 108 can be suppressed, the footprint of the cell can be stably fixed, and as a result, the deterioration of the communication quality can be prevented.

The tilt angle ψ of the antenna element (planar antenna) 132 is set according to, for example, a distance between the uppermost antenna element 132 and the surface of the antenna-mounting member 108, the beam width, or the like. For example, when the distance between the vertical center of the uppermost antenna element 132 and the surface of the antenna-mounting member 108 is 5 to 10 [cm], the tilt angle ψ of the antenna element (planar antenna) 132 may be set to 10 [deg.] to 30 [deg.], and more preferably 20 [deg.].

In the configuration example of FIG. 13A, a lower end portion 132a of the antenna element 132 is supported by the outer peripheral surface of the antenna-main body support section 131, and the antenna element 132 is tilted by rotating to the outside of the main body around its support position. In this configuration example, since the beam of the antenna element 132 is unlikely to interfere with the antenna-main body support section 131, it is not necessary to form an escape portion for ensuring a beam passage on the portion of outer peripheral surface of the antenna-main body support section 131.

In the configuration example of FIG. 13B, a central portion 132b of the antenna element 132 is supported by the outer peripheral surface of the antenna-main body support section 131, and the antenna element 132 is tilted by rotating around its support position.

In the configuration example of FIG. 13C, an upper end portion 132c of the antenna element 132 is supported by the outer peripheral surface of the antenna-main body support section 131, and the antenna element 132 is tilted by rotating inward of the main body around its support position. In this configuration example, since there are few portions of the antenna element 132 that protrude from the outer peripheral surface of the antenna-main body support section 131, the size of the SL antenna 130 can be miniaturized.

Figure 14A:
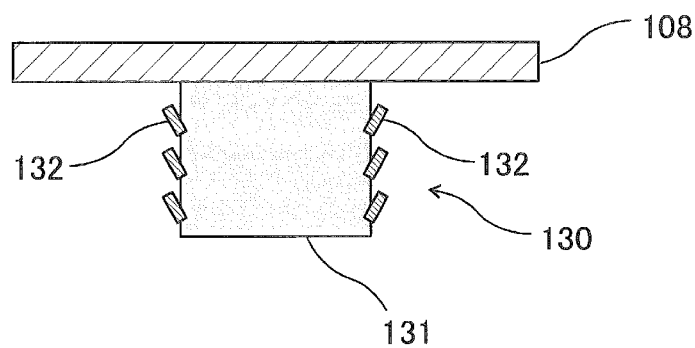
FIG. 14A is a vertical sectional view showing an example of a configuration of an antenna for service link in which an antenna element is tilted in a HAPS according to an embodiment.
Figure 14B:
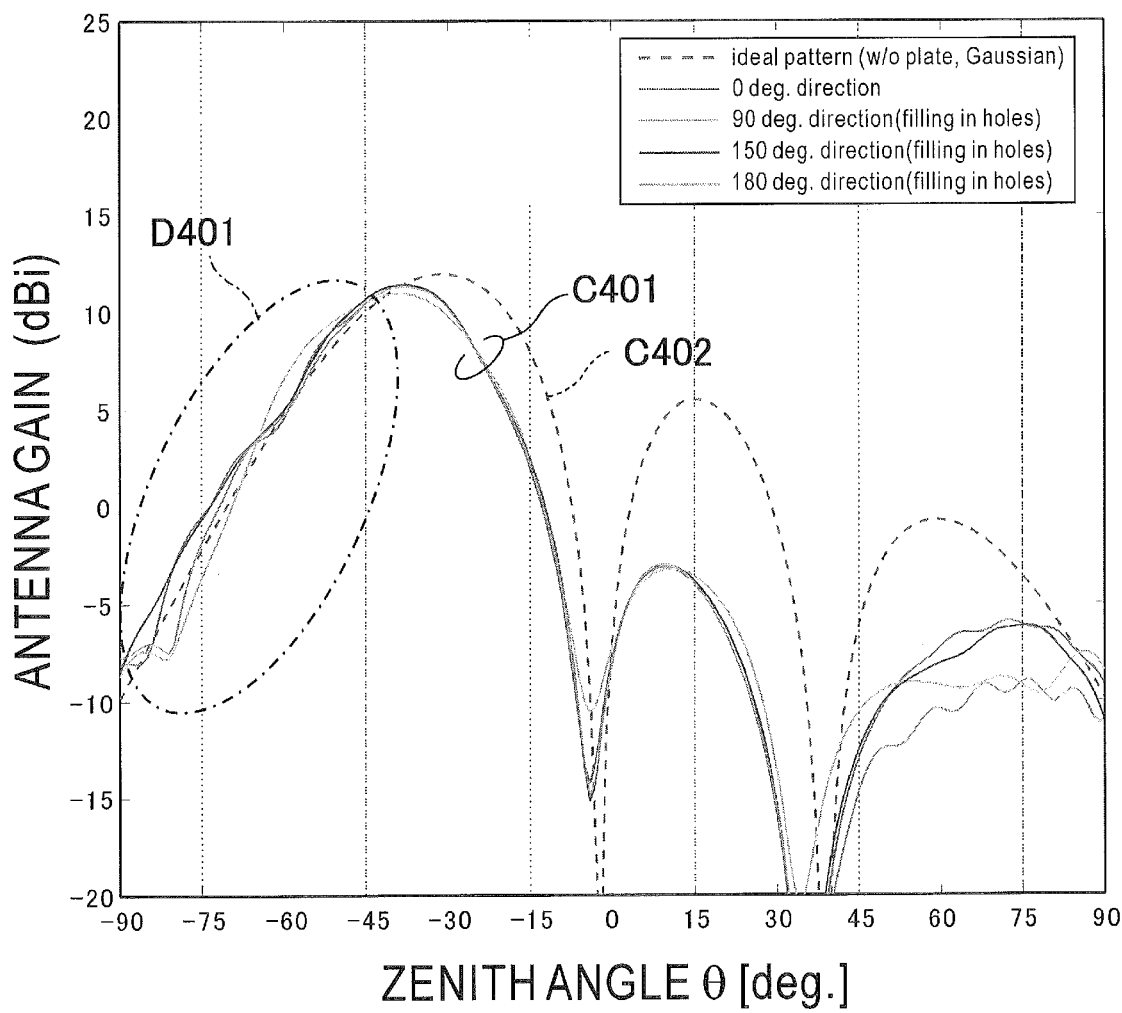
FIG. 14B is a graph showing an example of directivity characteristics of the antenna for service link.

FIG. 14A is a vertical sectional view showing an example of a configuration of the SL antenna 130 in which the antenna element 132 is tilted in the HAPS 10 according to an embodiment. FIG. 14B is a graph of a result of a computer simulation showing an example of directivity characteristics (beam pattern) showing an example of the effect of tilting the antenna element 132 of the SL antenna 130 in FIG. 14A. As shown in the directivity characteristics in the area surrounded by D401 in FIG. 14B, in the range of the zenith angle θ toward the ground, the fluctuation of the antenna gain C401 is small and the beam is stable for all of the four types of azimuth angles 9.

Figure 15A:
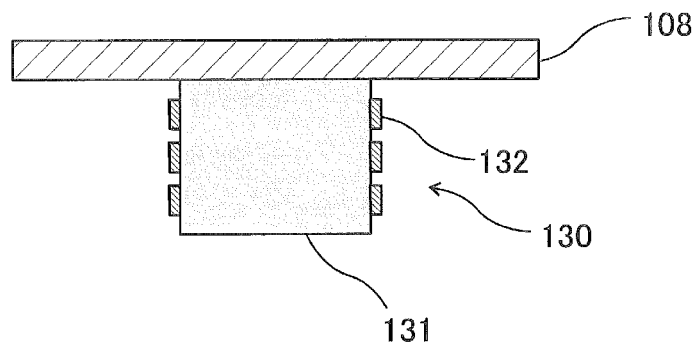
FIG. 15A is a vertical sectional view showing an example of a configuration of an antenna for service link in which an antenna element is not tilted according to a reference example.
Figure 15B:
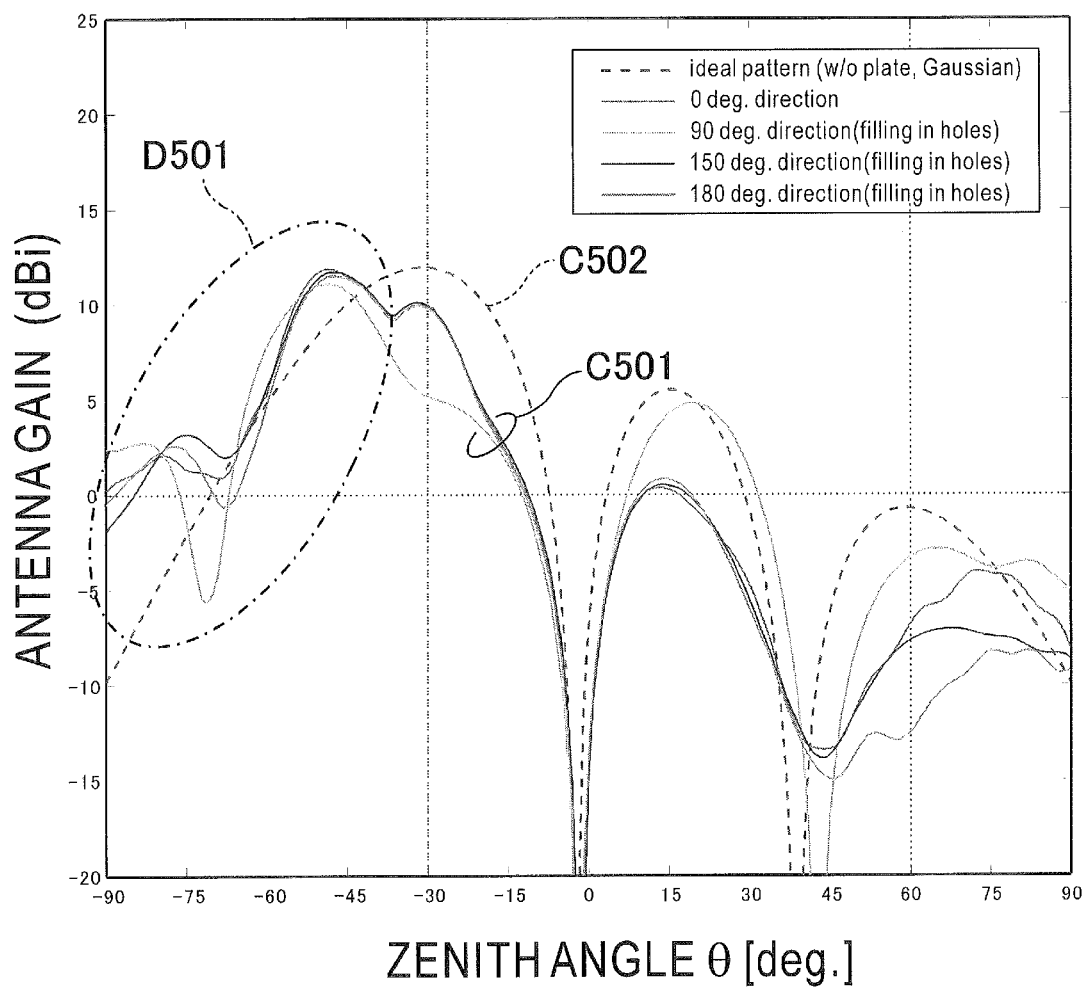
FIG. 15B is a graph showing an example of directivity characteristics of the antenna for service link.

On the other hand, in the comparative reference example when the antenna element 132 is not tilted shown in FIG. 15A and FIG. 15B, as shown in the directivity characteristics in the area surrounded by D501 in FIG. 15B, in the range of the zenith angle θ toward the ground, for all of the four types of azimuth angles 9 the antenna gain C401 fluctuates greatly and the beam is disturbed.

Configuration Example 3 of Anti-Reflection Measures

Figure 16A:
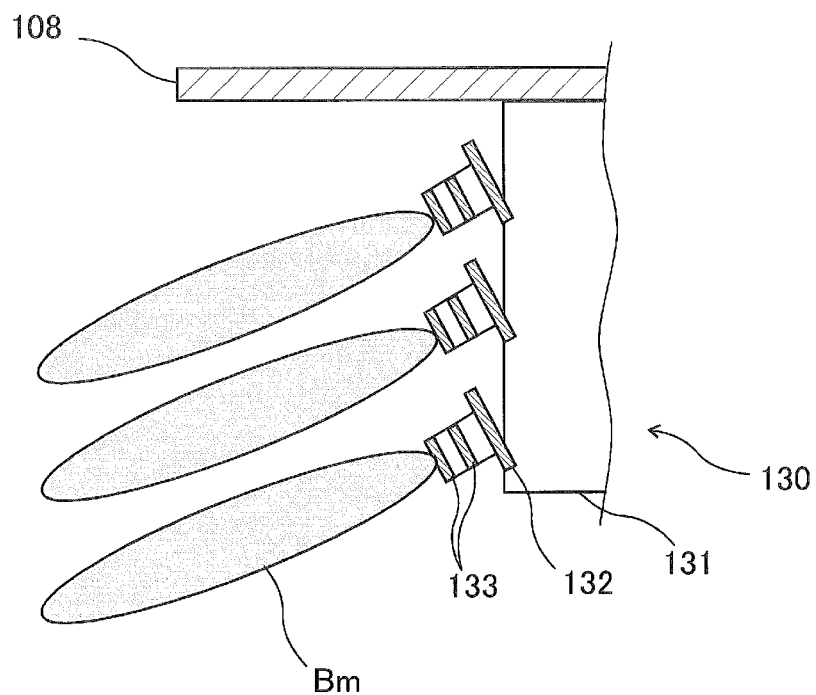
FIG. 16A is an illustration showing an example of a beam of an antenna for service link having a non-feeding element in HAPS according to an embodiment.

FIG. 16A is an illustration showing an example of a beam of an SL antenna 130 having a non-feeding element 133 in the HAPS 10 according to an embodiment. In FIG. 16A, a conductive non-feeding element 133 is disposed at a predetermined distance in front of each of the plural tilted antenna elements 132 of the SL antenna 130. The non-feeding element 133 is supported by, for example, a support frame or a support arm connected to the antenna-main body support section 131. Although two non-feeding elements 133 are disposed in the illustrated example, the number of non-feeding elements 133 may be one or three or more.

Figure 16B:
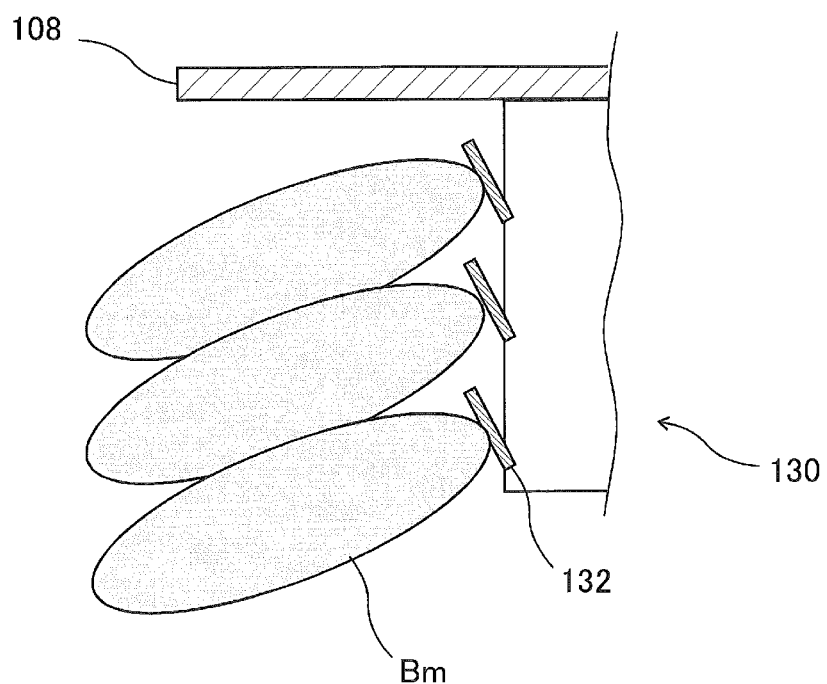
FIG. 16B is an illustration showing an example of a beam of an antenna for service link that does not have a non-feeding element according to a reference example.

By arranging the non-feeding element 133 in front of each of the plural antenna elements 132 of the SL antenna 130, the width of the beam of each antenna element 132 is narrower than that of the reference example in which the non-feeding element 133 in FIG. 16B is not disposed. Therefore, it is possible to prevent the radio wave radiated from the SL antenna 130 from being reflected by the antenna-mounting member 108. Accordingly, the fluctuation of the directivity pattern due to the reflection on the antenna-mounting member 108 can be suppressed, the footprint of the cell can be stably fixed, and as a result, the deterioration of the communication quality can be prevented.

The configuration example 2 (tilt of the antenna element), the configuration example 3 (arrangement of the non-feeding element), or both of them may be combined with the configuration example 1 (the layer of radio wave absorber 109 provided on the surface of the antenna-mounting member 108).

Figure 17A:
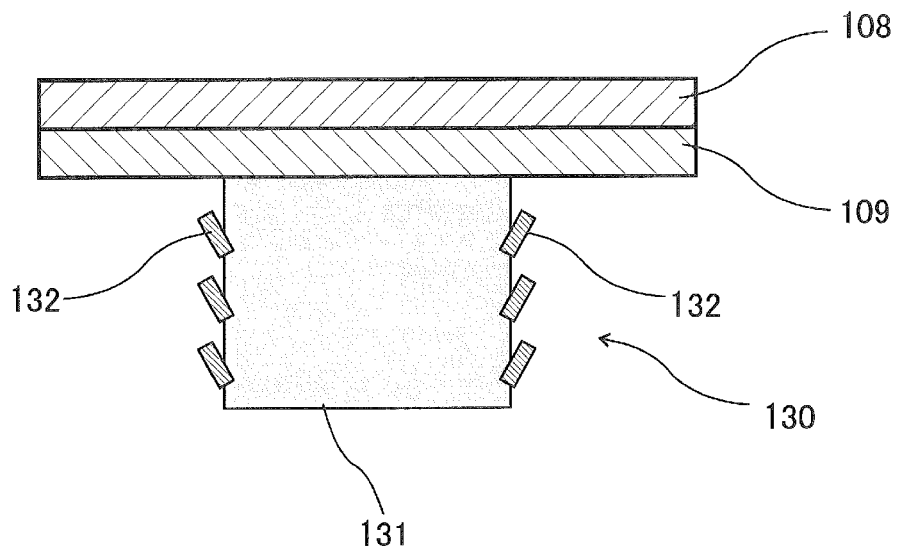
FIG. 17A is a cross-sectional view showing an example of a configuration in which an antenna for service link having an inclined antenna element and an antenna-mounting member having a layer of radio wave absorber are combined in a HAPS according to an embodiment.

For example, as shown in FIG. 17A, the layer of radio wave absorber 109 may be provided on the surface of the antenna-mounting member 108, and each of the plural antenna elements 132 of the SL antenna 130 may be tilted.

Figure 17B:
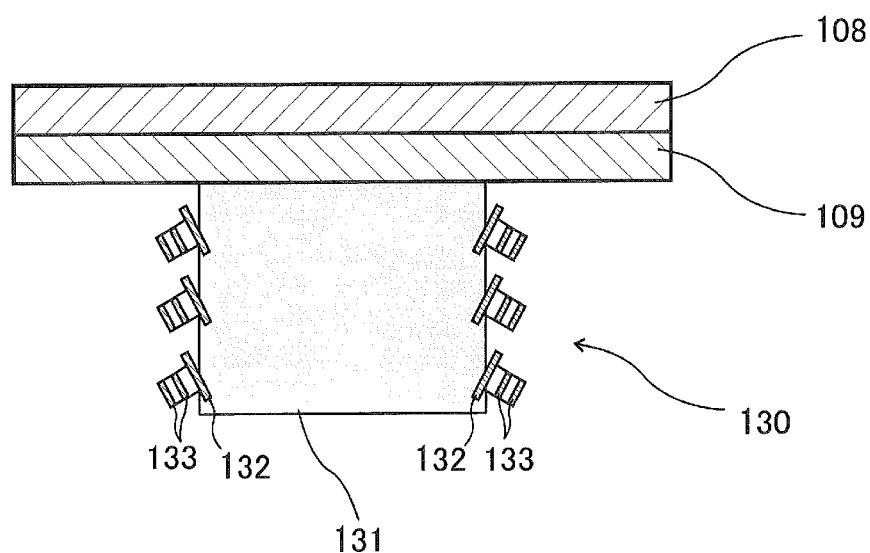
FIG. 17B is a cross-sectional view showing an example of a configuration in which an antenna for service link having an inclined antenna element and a non-feeding element and an antenna-mounting member having a layer of radio wave absorber are combined in a HAPS according to an embodiment.

As shown in FIG. 17B, the layer of radio wave absorber 109 may be provided on the surface of the antenna-mounting member 108, and the non-feeding elements 133 may be disposed in front of the plural tilted antenna elements 132 of the SL antenna 130.

Configuration Example 4 of Anti-Reflection Measures

In the present configuration example, in consideration of the reflection so that the footprints 100F(1) to 100F(7) in FIG. 1 can be fixed even if there is a reflection due to the surface of the antenna-mounting member 108, a digital beamforming (DBF) control (hereinafter, also referred to as "footprint-fixing control"), which controls the amplitude and phase of the digital signal for the signal transmitted to and received from each antenna element 132 of the SL antenna 130, is performed.

The DBF control may be performed based on at least one information on the position and the attitude (for example, with respect to a predetermined direction) of the HAPS 20 while considering the reflection by the surface of the antenna-mounting member 108.

Information on the position and attitude of the HAPS 10 itself may be acquired based on an output of a GPS receiver, a gyro sensor, an acceleration sensor, an inertial sensor, etc. incorporated in the HAPS 10. For example, the information on the position and attitude of the HAPS 10 itself may be acquired based on an output of a GNSS inertial navigation system (GNSS/INS) that combines a GNSS (Global Navigation Satellite System) system and an inertial measurement unit (IMU: Inertial Measurement Unit) incorporated in the HAPS 10.

The attitude change of the HAPS 10 may be defined by, for example, the following changes in a roll angle θr, a pitch angle θp, and a yaw angle θy. The roll angle θr is a rotation angle centered on the roll axis Y along the front-back direction (forward traveling direction) of the HAPS 10. The pitch angle θp is a rotation angle centered on the pitch axis X along the left-right direction of the HAPS 10. The yaw angle θy is a rotation angle centered on the yaw axis Z along the vertical direction of the HAPS 10. Since the airframe of HAPS 10 of the present embodiment exhibits a three-dimensional movement (for example, changes in longitude, latitude and altitude, and rotation around the roll axis, pitch axis and yaw axis) in the upper airspace, the DBF control may be applied so as to correspond to the three-dimensional movement in consideration of, for example, the roll angle θr, the pitch angle θp, and the yaw angle θy. In particular, the DBF control of the present embodiment is effective in fixing the footprint by yawing of the HAPS 10 (rotational motion around the vertical axis of the airframe).

Figure 18:
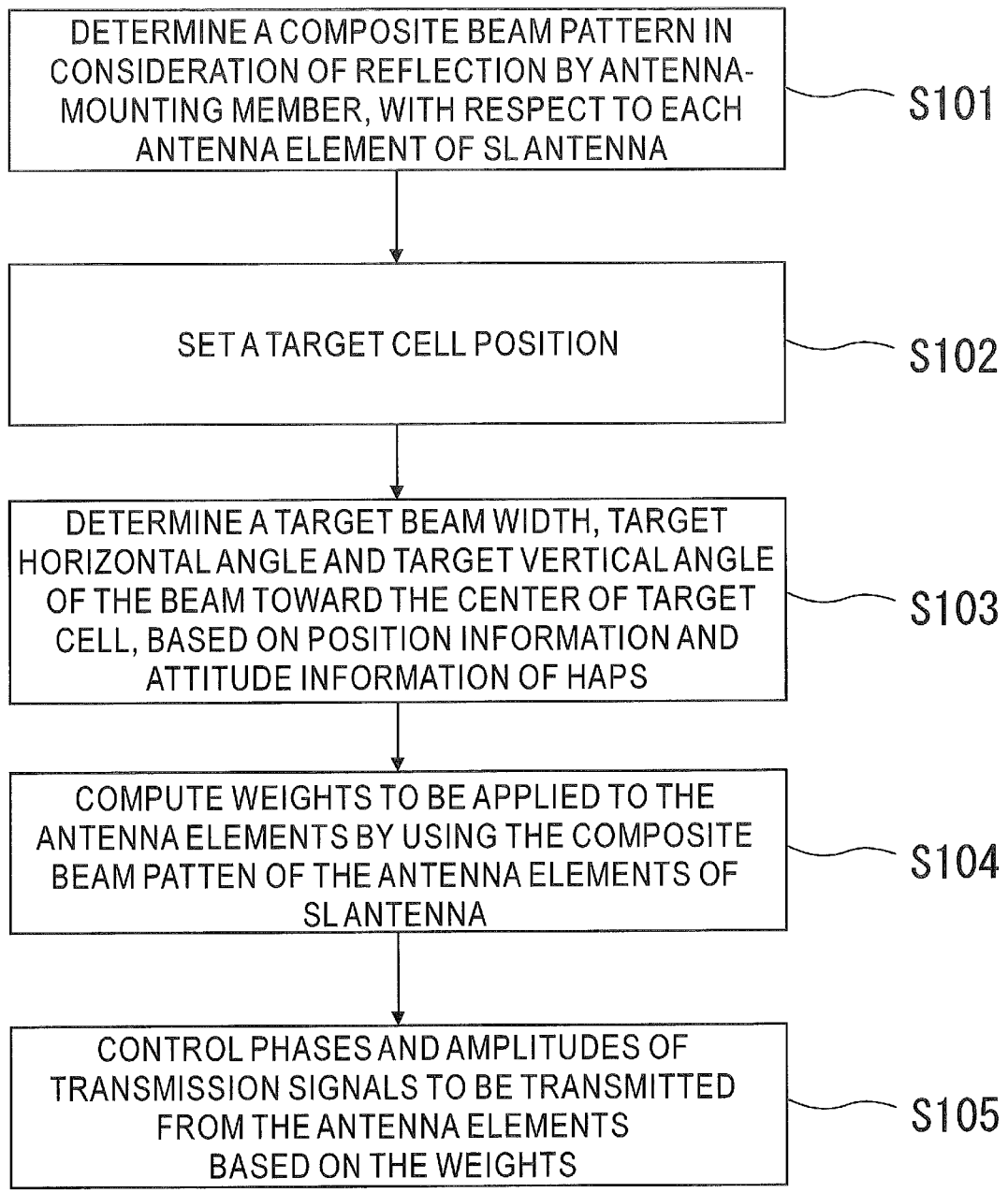
FIG. 18 is a flowchart showing an example of a digital beamforming (DBF) control in a HAPS according to an embodiment.

FIG. 18 is a flowchart showing an example of the digital beamforming (DBF) control in the HAPS 10 according to an embodiment. In the control example of FIG. 18, for simplification of the description, a transmission signal radiated from the antenna element 132 in a direction of an arbitrary zenith angle θ in a vertical plane passing through the center of the antenna element 132 is described.

In the control example of FIG. 18, first, a complex amplitude matrix (composite beam pattern) of a beam of each antenna element 132 is determined in consideration of the reflection by the antenna-mounting member 108 (S101). For example, assuming that an element (direct beam pattern) of a complex amplitude matrix of a direct wave of a transmission signal radiated from the antenna element 132 in a direction of an arbitrary zenith angle θ in a vertical plane passing through the center of the antenna element 132 is r·exp (iθ), since the transmission signal radiated from the antenna element 132 is reflected by the antenna-mounting member 108 and the reflected wave directed in the direction of the zenith angle θ and the azimuth angle φ changes in a phase by θ" and also changes in an amplitude from r to r", an element (reflected beam pattern) of the complex amplitude matrix of the reflected wave is represented by r"·exp {i (θ+θ")}. Since the direct wave and the reflected wave are combined and reached on the distant ground, an element (composite beam pattern) of the complex amplitude matrix of the synthesized transmission signal is represented by r·exp (iθ)+r"·exp {i (θ+θ")}. Assuming that the signal r·exp (iθ)+r"·exp {i (θ+θ")} of this composite pattern is transmitted from one antenna element 132, the element (composite pattern) r·exp (iθ)+r"·exp {i (θ+θ")} of the complex amplitude matrix of the synthesized transmission signal is used to determine a corrected complex amplitude matrix (composite beam pattern) of the beam of each antenna element 132.

Next, in order to prevent a cell-to-cell interference on the ground, a target cell (position and size) formed by a linear array antenna configured with plural antenna elements 132 disposed in the vertical direction of the SL antenna 130 is set (S102).

Next, based on the position information and the attitude information of the HAPS 10, a target beam width, a target horizontal angle and a target vertical angle of the beam from the HAPS 10 toward the center of the target cell are determined so as to fix the position of the footprint of the target cell with reference to the orientation in the reference direction preset in the HAPS 10 (S103).

Next, based on the target beam width, the target horizontal angle and the target vertical angle of the beam toward the target cell, plural weights to be applied to the plural antenna elements 132 are calculated by a matrix operation (inverse matrix operation) using the composite pattern $r \exp(i\theta) + r'' \cdot \exp\{i(\theta + \theta'')\}$ of the plural antenna elements 132 constituting the linear array antenna in the SL antenna 130 (S104).

Next, based on the plural weights, a DBF control for controlling the phases and amplitudes of the transmission signals transmitted from the plural antenna elements 132 is performed (S105). For example, an overall structure of the SL antenna 130 is mathematically expressed, and the phases and amplitudes of the transmission signals transmitted from the plural antenna elements 132 are controlled by the plural weights for the entire plural antenna elements 132 of the SL antenna 130.

Figure 19:
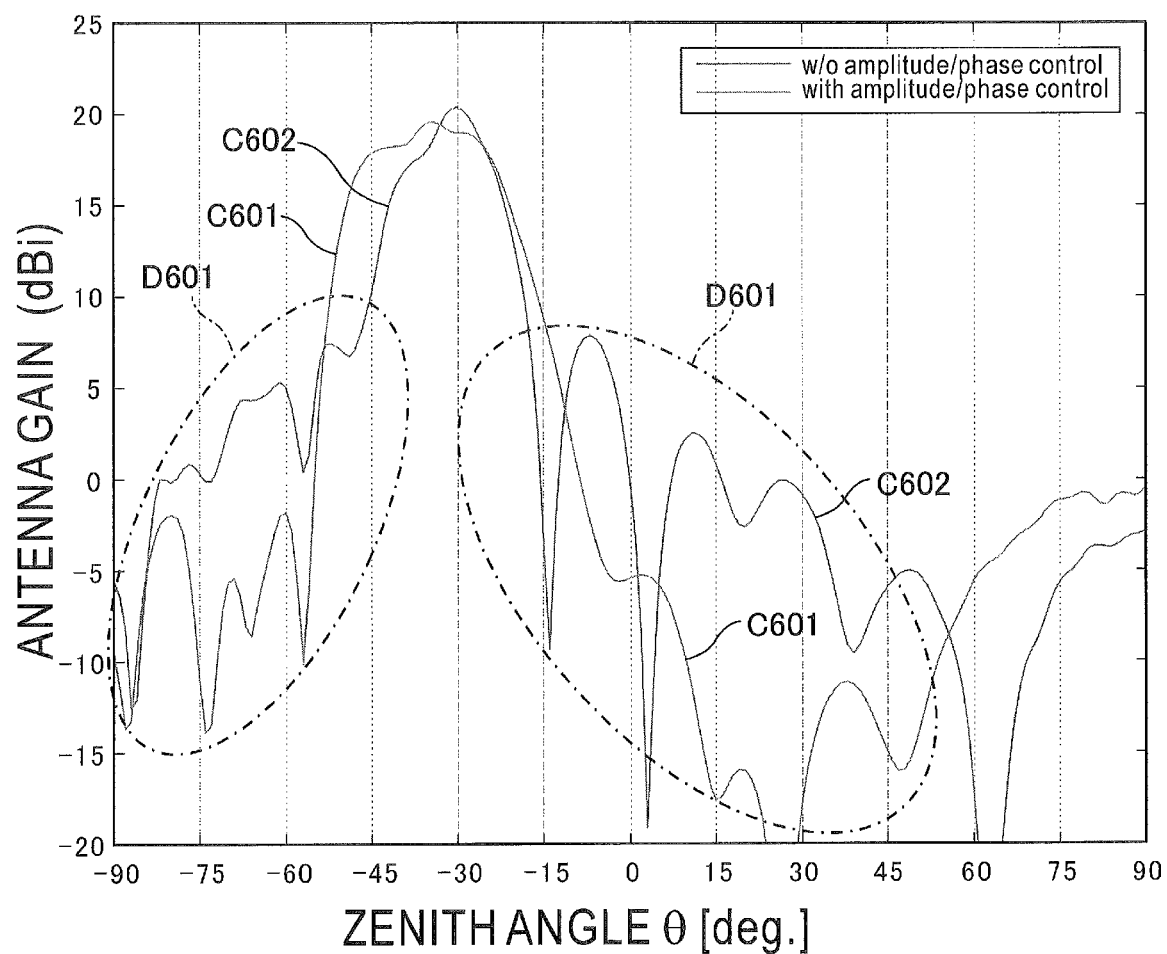
FIG. 19 is an illustration showing an example of a configuration of a control system for a digital beamforming (DBF) control in a HAPS according to an embodiment.

FIG. 19 is a graph showing an example of directivity characteristics when the amplitude and phase of the signal supplied to the SL antenna are controlled by using the weights determined in consideration of the reflection by the antenna-mounting member 108 in the HAPS 10 according to an embodiment. FIG. 19 shows results of calculating the gains [dBi] of the SL antenna 130 at a distance sufficiently away from the SL antenna 130 when the DBF control is performed by using the computer simulation. A curve C601 in the figure is a pattern of the directivity characteristics when the DBF control is performed, and a curve C602 is a pattern of the directivity characteristics when the DBF control is not performed. By performing the DBF control of the present configuration example, a radiation level of an unnecessary radio wave caused by the reflection in an area outside the target cell surrounded by D601 and D602 in FIG. 19 can be suppressed to be lower than that in the case where the DBF control is not performed.

By performing the DBF control of the present configuration example, it is possible to suppress the influence of the reflected wave that is the radio wave radiated from the SL antenna 130 and reflected by the antenna-mounting member 108. Therefore, the fluctuation of the directivity pattern due to the reflection on the antenna-mounting member 108 can be suppressed, the footprint of the cell can be stably fixed, and as a result, the deterioration of the communication quality can be prevented.

In the DBF control, the phases and amplitudes of the transmission signals transmitted from the plural antenna elements 132 may also be controlled for the azimuth angle (steering angle) $\varphi$ of the beam of the SL antenna 130. For example, for a circular array antenna configured with plural antenna elements 132 disposed in the circumferential direction of the SL antenna 130, plural weights to be applied to the plural antenna elements 132 may be further calculated, and the plural weights may be further applied to control the phases and amplitudes of the transmission signals transmitted from the plural antenna elements 132.

In the DBF control, since the weight of the antenna element 132 of the SL antenna 130 are expressed in complex number format (amplitude and phase), the amount of calculation is large and the power consumption is heavy if the weights are calculated from the inverse matrix every time. Therefore, the weights may be accurately calculated in advance for plural zenith angles $\theta$ and plural azimuth angles (steering angles) $\varphi$ using the inverse matrix, an approximate expression that approximates the relationship between the weights and the zenith angles $\theta$ and the azimuth angles (steering angles) $\varphi$ may be created, and information on the approximate expression may be stored in a storage section such as a memory. Then, the position and attitude (including the orientation) of the airframe of the HAPS 10 may be detected by information acquisition means such as a GNSS/INS, the steering angle (angle for forming the directional beam) $\varphi$, which is the target azimuth angle in the direction of forming the beam (three-dimensional cell) of the service link, may be determined based on the value of the detection result, and values of amplitudes and phases of the weights may be calculated from the approximate expression created and held in advance, based on the target steering angle $\varphi$. By calculating the values of amplitudes and phases of the weights using the approximate expression held in the storage section in this way, it is possible to reduce a power consumption by reducing the amount of calculation.

Figure 20:
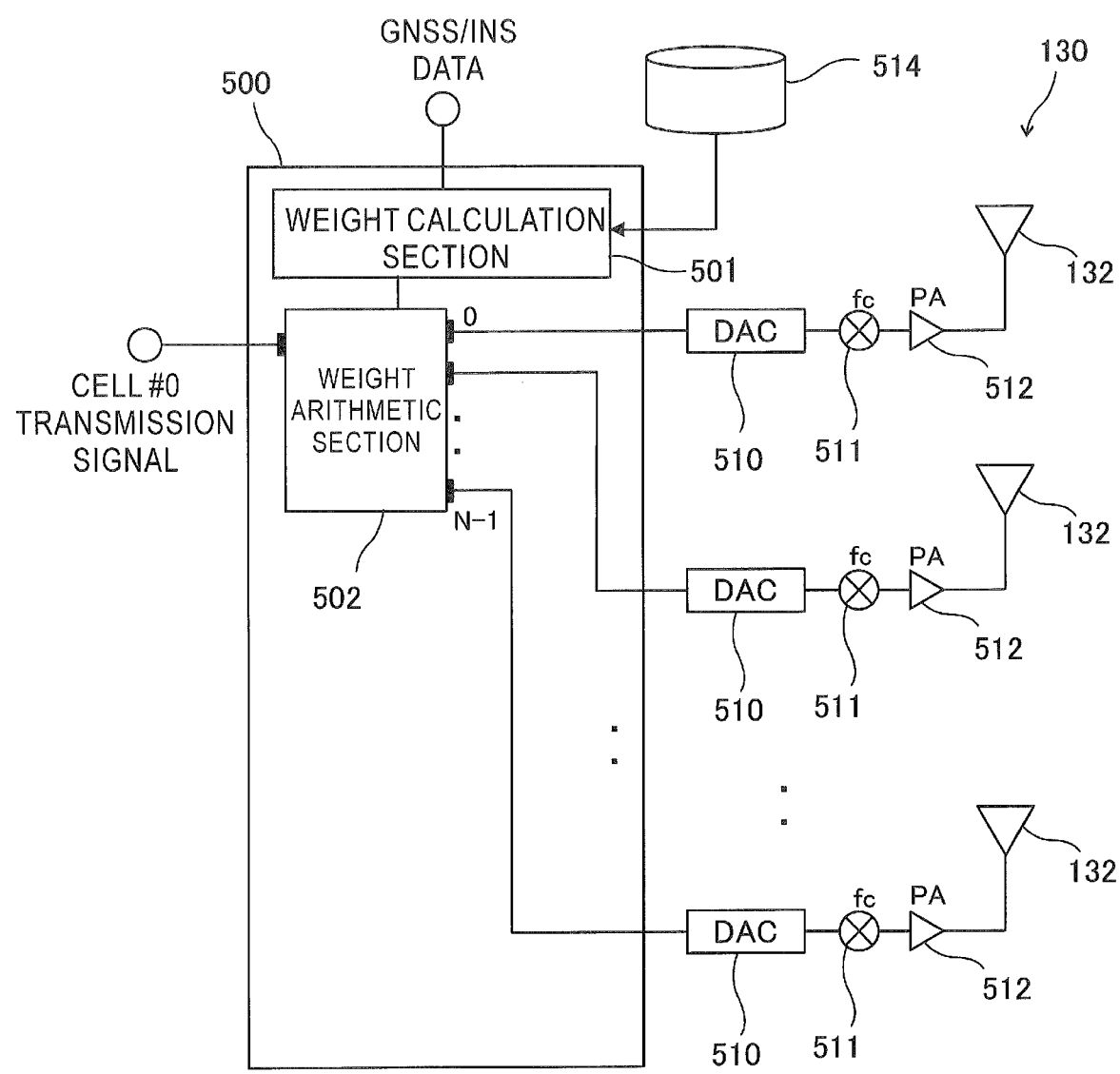
FIG. 20 is a graph showing an example of directivity characteristics when an amplitude and a phase of a signal supplied to an antenna for service link are controlled by using weights determined in consideration of a reflection by an antenna-mounting member in a HAPS according to an embodiment.

FIG. 20 is an illustration showing an example of a configuration of a control system for a digital beamforming (DBF) control in the HAPS 10 according to an embodiment. The example of FIG. 20 is an example of forming one cell (#0) with a linear array antenna configured with N antenna elements 132 of a cylinder type SL antenna 130. In FIG. 20, for the sake of simplification of the illustration, only the downlink is described for the downlink and the uplink. Although only one of the horizontal and vertical polarizations (single polarization) is described in FIG. 20, a similar DBF control section is additionally provided when transmitting and receiving the signal of the other polarization.

A DBF control section 500 is provided with a weight calculation section 501 and a weight arithmetic section 502. The weight calculation section 501 calculates the above-mentioned weights (vector data of amplitude and phase) to be applied to the transmission signals (digital baseband signals) transmitted by the plural antenna elements 132 (0 to N−1) of the linear array antenna constituting the SL antenna 130, based on the data of position and attitude of the HAPS 10 acquired by the GNSS/INS and the position information on the target cell.

The weight arithmetic section 502 generates plural digital transmission signals (0 to N−1) corresponding to the plural antenna elements 132 (0 to N−1) by applying the weights calculated by the weight calculation section 501 to the digital transmission signal. Each of the plural digital transmission signals (0 to N−1) output from the weight arithmetic section 502 is converted into an analog signal by a DA converter (DAC) 510, converted to a predetermined transmission frequency fc by a frequency converter 511, amplified to a predetermined power by a power amplifier (PA) 512, and then supplied to the corresponding antenna element 132 (0 to N−1).

By the above-mentioned DBF control, the antenna directional beam can be formed from the linear array antenna toward the target position, and the transmission signal can be transmitted to the terminal apparatus located in the cell with the state that fixed the footprint.

In FIG. 20, weights, which correspond to plural sets of the positions and attitudes (tilt angles and orientations) of aircraft different from each other in the predicted movement path of the HAPS 10 in reference to the position of the service area, may be calculated in advance and stored in a storage section 514 such as a memory. The weight calculation section 501 refers to the storage section 514 based on the attitude and position of the aircraft calculated from the GNSS/INS data, reads the weights corresponding to the calculated attitude and position of aircraft, and uses the weights for the calculation of the transmission signal in the weight arithmetic section 502. In this case, since iterative weight calculations are not necessary, the calculation amount and the power consumption can be significantly reduced.

The DBF control in the above-mentioned configuration example 4 may be performed by the HAPS 10 making an autonomous determination, and may be performed by a control command from an external apparatus such as a remote control apparatus or a server. The DBF control may be performed periodically at predetermined time intervals, and may be performed when the movement distance or the attitude change of the HAPS 10 becomes larger than a predetermined value.

The DBF control according to the present configuration example 4 may be combined with the above-mentioned configuration example 1 (the layer of radio wave absorber 109 provided on the surface of the antenna-mounting member 108), the above configuration example 2 (the tilt of antenna element), the configuration example 3 (the arrangement of non-feeding elements), or a configuration that combines any two or three of these configuration examples. For example, the weights may be calculated for the respective antenna elements of the SL antenna 130 in FIG. 10A and FIG. 10B, FIG. 13A to FIG. 13C, FIG. 16A and FIG. 16B, or FIG. 17A and FIG. 17B described above, and the phases and amplitudes of the transmission signals transmitted from the plural antenna elements 132 may be controlled by using the weights.

As mentioned above, according to the present embodiment, it is possible to suppress fluctuations in the directivity pattern due to the reflection at the antenna-mounting member 108 to which the SL antenna 130 for the service link of the HAPS 10 is mounted, to stably fix the footprint of the cell, and as a result, to prevent a deterioration of communication quality.

It is noted that, the process steps and configuration elements of the relay communication station of the communication relay apparatus such as the HAPSs 10 and 20, the feeder station, the gateway station, the management apparatus, the remote control apparatus, the server, the terminal apparatus (user apparatus, mobile station, communication terminal), the base station and the base station apparatus described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, relay communication station, feeder station, gateway station, base station, base station apparatus, relay-communication station apparatus, terminal apparatus (user apparatus, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10 HAPS (solar plane type)
10A service area
20 HAPS (airship type)
61 terminal apparatus
70 gate way station (GW station)
80 mobile communication network
100A cell
100C, 100C(1) to 100C(7) three dimensional cell
100F, 100F(1) to 100F(7) foot print
110, 210 relay communication station
130 antenna for service link (SL antenna)

131 antenna-main body support section
132 antenna element
132a lower end portion
132b central portion
132c upper end portion
133 non-feeding element
500 DBF control section
501 weight calculation section
502 weight arithmetic section
510 DA converter (DAC)
511 frequency converter
512 power amplifier (PA)
514 storage section

The invention claimed is:

1. An aerial-staying type communication relay apparatus for wirelessly communicating with a terminal apparatus, comprising:
 a cylinder type antenna having a main body with a cylindrical peripheral surface shape or a polygonal prism peripheral surface shape and plural antenna elements disposed so as to be distributed along an outer peripheral surface of the main body, the antenna forming a cell for performing a radio communication of a service link to and from the terminal apparatus; and
 an antenna-mounting member to which a base face of the cylinder type antenna is mounted, and
 wherein a layer of radio wave absorber or a layer of frequency-selective electromagnetic shielding member that selectively shields a radio wave having a frequency of the service link is provided on an outer surface of the antenna-mounting member so that the outer surface is not exposed.

2. The communication relay apparatus according to claim 1,
 wherein each of the plural antenna elements is tilted so that a direction of an antenna directional beam perpendicular to an antenna main surface of each of the antenna elements faces downward from a horizontal direction and supported by an antenna-main body support section.

3. The communication relay apparatus according to claim 2,
 wherein each of the plural antenna elements is supported on an outer peripheral surface of the antenna-main body support section at a lower end portion, a central portion or an upper end portion of each of the antenna elements, and is tilted by rotating around a support position.

4. The communication relay apparatus according to claim 1,
 wherein each of the plural antenna elements has a non-feeding element that narrows an antenna directional beam perpendicular to an antenna main surface of each of the antenna elements.

5. The communication relay apparatus according to claim 1, further comprising a control section for controlling phases and amplitudes of plural transmission and reception signals transmitted and received via each of the plural antenna elements of the antenna, and
 wherein the control section:
  determines a target beam width, a target horizontal angle and a target vertical angle of an antenna directional beam from the communication relay apparatus toward a center of the cell so as to fix a position of a footprint of the cell, with reference to an orientation in a reference direction preset in the communication relay apparatus; and
  controls phases and amplitudes of plural transmission and reception signals transmitted and received via each of the plural antenna elements of the antenna so as to form an antenna directional beam having the target beam width, the target horizontal angle and the target vertical angle, based on a composite beam pattern that combines a beam pattern of a direct wave of each of the plural antenna elements and a beam pattern of a reflected wave by the antenna-mounting member.

6. An aerial-staying type communication relay apparatus for wirelessly communicating with a terminal apparatus, comprising:
 an antenna having plural antenna elements that forms a cell for performing a radio communication of a service link to and from the terminal apparatus; and
 an antenna-mounting member to which the antenna is mounted, and
 wherein each of the plural antenna elements has a conductive non-feeding element that narrows an antenna directional beam perpendicular to an antenna main surface of each of the antenna elements, the conductive non-feeding element being disposed at a predetermined distance in front of each of the plural antenna elements.

7. The communication relay apparatus according to claim 6, further comprising a control section for controlling phases and amplitudes of plural transmission and reception signals transmitted and received via each of the plural antenna elements of the antenna, and
 wherein the control section:
  determines a target beam width, a target horizontal angle and a target vertical angle of an antenna directional beam from the communication relay apparatus toward a center of the cell so as to fix a position of a footprint of the cell, with reference to an orientation in a reference direction preset in the communication relay apparatus; and
  controls phases and amplitudes of plural transmission and reception signals transmitted and received via each of the plural antenna elements of the antenna so as to form an antenna directional beam having the target beam width, the target horizontal angle and the target vertical angle, based on a composite beam pattern that combines a beam pattern of a direct wave of each of the plural antenna elements and a beam pattern of a reflected wave by the antenna-mounting member.

8. The communication relay apparatus according to claim 6,
 wherein the antenna is a cylinder type antenna having plural antenna elements disposed so as to be distributed along an outer peripheral surface of a main body having a cylindrical peripheral surface shape or a polygonal prism peripheral surface shape.

9. The communication relay apparatus according to claim 8,
 wherein the cylinder type antenna is configured with plural sets of circular type array antennas, each set of the circular type array antennas having plural antenna elements disposed in a circumferential direction of the outer peripheral surface of the main body having the cylindrical peripheral surface shape or the polygonal prism peripheral surface shape, the plural sets of circular type array antennas being disposed in a direction parallel to a central axis of the main body.

10. An aerial-staying type communication relay apparatus for wirelessly communicating with a terminal apparatus, comprising:
an antenna having plural antenna elements that forms a cell for performing a radio communication of a service link to and from the terminal apparatus;
an antenna-mounting member to which the antenna is mounted; and
a control section for controlling phases and amplitudes of plural transmission and reception signals transmitted and received via each of the plural antenna elements of the antenna,
wherein a layer of radio wave absorber or a layer of frequency-selective electromagnetic shielding member that selectively shields a radio wave having a frequency of the service link is provided on an outer surface exposed to an outside of the antenna-mounting member,
wherein the control section:
determines a target beam width, a target horizontal angle and a target vertical angle of an antenna directional beam from the communication relay apparatus toward a center of the cell so as to fix a position of a footprint of the cell, with reference to an orientation in a reference direction preset in the communication relay apparatus; and
controls phases and amplitudes of plural transmission and reception signals transmitted and received via each of the plural antenna elements of the antenna so as to form an antenna directional beam having the target beam width, the target horizontal angle and the target vertical angle, based on a composite beam pattern that combines a beam pattern of a direct wave of each of the plural antenna elements and a beam pattern of a reflected wave by the antenna-mounting member and
wherein the communication relay apparatus:
calculates weights to be applied respectively to the plural transmission and reception signals for the plural antenna elements so as to form an antenna directional beam having the target beam width, the target horizontal angle and the target vertical angle, based on the composite beam pattern that combines the beam pattern of the direct wave of each of the plural antenna elements and the beam pattern of the reflected wave by the antenna-mounting member; and
controls the phases and amplitudes of the plural transmission and reception signals based on the plural weights.

11. The communication relay apparatus according to claim 10,
wherein the antenna is a cylinder type antenna having plural antenna elements disposed so as to be distributed along an outer peripheral surface of a main body having a cylindrical peripheral surface shape or a polygonal prism peripheral surface shape.

12. The communication relay apparatus according to claim 11,
wherein the cylinder type antenna is configured with plural sets of circular type array antennas, each set of the circular type array antennas having plural antenna elements disposed in a circumferential direction of the outer peripheral surface of the main body having the cylindrical peripheral surface shape or the polygonal prism peripheral surface shape, the plural sets of circular type array antennas being disposed in a direction parallel to a central axis of the main body.

13. An aerial-staying type communication relay apparatus for wirelessly communicating with a terminal apparatus, comprising:
an antenna having plural antenna elements that form a cell for performing a radio communication of a service link to and from the terminal apparatus;
an antenna-mounting member to which the antenna is mounted; and
a control section for controlling phases and amplitudes of plural transmission and reception signals transmitted and received via each of the plural antenna elements of the antenna, and
wherein the control section:
determines a target beam width, a target horizontal angle and a target vertical angle of an antenna directional beam from the communication relay apparatus toward a center of the cell so as to fix a position of a footprint of the cell with reference to an orientation in a reference direction preset in the communication relay apparatus; and
controls phases and amplitudes of plural transmission and reception signals transmitted and received via each of the plural antenna elements of the antenna so as to form an antenna directional beam having the target beam width, the target horizontal angle and the target vertical angle, based on a composite beam pattern that combines a beam pattern of a direct wave of each of the plural antenna elements and a beam pattern of a reflected wave by the antenna-mounting member, and
wherein the communication relay apparatus:
calculates weights to be applied respectively to the plural transmission and reception signals for the plural antenna elements so as to form an antenna directional beam having the target beam width, the target horizontal angle and the target vertical angle, based on the composite beam pattern that combines the beam pattern of the direct wave of each of the plural antenna elements and the beam pattern of the reflected wave by the antenna-mounting member; and
controls the phases and amplitudes of the plural transmission and reception signals based on the plural weights.

14. The communication relay apparatus according to claim 13,
wherein the antenna is a cylinder type antenna having plural antenna elements disposed so as to be distributed along an outer peripheral surface of a main body having a cylindrical peripheral surface shape or a polygonal prism peripheral surface shape.

15. The communication relay apparatus according to claim 14,
wherein the cylinder type antenna is configured with plural sets of circular type array antennas, each set of the circular type array antennas having plural antenna elements disposed in a circumferential direction of the outer peripheral surface of the main body having the cylindrical peripheral surface shape or the polygonal prism peripheral surface shape, the plural sets of circular type array antennas being disposed in a direction parallel to a central axis of the main body.

* * * * *